(12) United States Patent
Houghton et al.

(10) Patent No.: US 7,240,092 B2
(45) Date of Patent: Jul. 3, 2007

(54) DISPLAYING COMPLEMENTARY CONTENT SOURCES

(75) Inventors: William Houghton, Washington, DC (US); George D. Escobar, Purcelville, VA (US); Carlos Silva, Potomac, MD (US); Robert M. Cooper, Washington, DC (US); Laurence Kirsh, Herndon, VA (US)

(73) Assignee: AOL LLC, Dulles, VA (US)

( * ) Notice: Subject to any disclaimer, the term of this patent is extended or adjusted under 35 U.S.C. 154(b) by 544 days.

(21) Appl. No.: 10/875,717

(22) Filed: Jun. 25, 2004

(65) Prior Publication Data

US 2005/0021609 A1    Jan. 27, 2005

Related U.S. Application Data

(63) Continuation of application No. 09/495,333, filed on Feb. 1, 2000, now Pat. No. 6,757,707.

(51) Int. Cl.
*G06F 15/16* (2006.01)
(52) U.S. Cl. .................. 709/203; 709/217; 725/109
(58) Field of Classification Search ........ 709/200–203, 709/217–229; 725/86–87, 91, 98, 100, 103, 725/105, 109, 110, 114, 118
See application file for complete search history.

(56) References Cited

U.S. PATENT DOCUMENTS

| | | | |
|---|---|---|---|
| 5,539,822 A | 7/1996 | Lett | |
| 5,589,892 A | 12/1996 | Knee et al. | |
| 5,774,664 A | 6/1998 | Hidary et al. | |
| 5,778,181 A | 7/1998 | Hidary et al. | |
| 5,818,935 A | 10/1998 | Maa | |
| 5,828,839 A | 10/1998 | Moncreiff | |
| 5,907,322 A | 5/1999 | Kelly et al. | |
| 5,929,849 A | 7/1999 | Kikinis | |
| 5,961,603 A | 10/1999 | Kunkel et al. | |
| 5,973,683 A | 10/1999 | Cragun et al. | |
| 5,990,927 A | 11/1999 | Hendricks et al. | |
| 5,991,735 A | 11/1999 | Gerace | |
| 5,999,970 A | 12/1999 | Krisbergh et al. | |

(Continued)

FOREIGN PATENT DOCUMENTS

EP    0 848 553 A2    6/1998

(Continued)

OTHER PUBLICATIONS

WebTVFAQx; as posted on www.webtv.net; Mar. 31, 1999; 9:26a.m.; 36 pages.

(Continued)

*Primary Examiner*—Moustafa M. Meky
(74) *Attorney, Agent, or Firm*—Fish & Richardson P.C.

(57) ABSTRACT

A computer-implemented method includes receiving a first URL address corresponding to a first web page, accessing content and serving the first web page based on the first URL address, receiving specification of a second URL address corresponding to a second web page, changing from the first web page to the second web page based on the received specification of the second URL address, motivating an automatic change in television channel from a first television channel to a second television channel based upon a change from the first web page to the second web page, and displaying the second television channel.

44 Claims, 20 Drawing Sheets

U.S. PATENT DOCUMENTS

| | | | |
|---|---|---|---|
| 6,002,394 A | 12/1999 | Schein et al. | |
| 6,018,764 A | 1/2000 | Field et al. | |
| 6,025,837 A | 2/2000 | Matthews, III et al. | |
| 6,028,599 A | 2/2000 | Yuen et al. | |
| 6,133,909 A | 10/2000 | Schein et al. | |
| 6,163,316 A * | 12/2000 | Killian | 715/721 |
| 6,172,677 B1 | 1/2001 | Stautner et al. | |
| 6,326,982 B1 | 12/2001 | Wu et al. | |
| 6,411,307 B1 | 6/2002 | Rosin et al. | |
| 6,477,579 B1 | 11/2002 | Kunkel et al. | |
| 6,510,557 B1 | 1/2003 | Thrift | |
| 6,513,069 B1 * | 1/2003 | Abato et al. | 709/238 |
| 6,546,002 B1 | 4/2003 | Kim | |
| 6,587,873 B1 | 7/2003 | Nobakht et al. | |
| 6,757,707 B1 | 6/2004 | Houghton et al. | |
| 6,785,902 B1 * | 8/2004 | Zigmond et al. | 725/38 |
| 7,076,792 B2 * | 7/2006 | Zigmond et al. | 725/38 |
| 2002/0049832 A1 * | 4/2002 | Ullman et al. | 709/218 |
| 2003/0204854 A1 * | 10/2003 | Blackketter et al. | 725/113 |
| 2004/0236865 A1 * | 11/2004 | Ullman et al. | 709/231 |
| 2005/0028206 A1 * | 2/2005 | Cameron et al. | 725/46 |

FOREIGN PATENT DOCUMENTS

| | | |
|---|---|---|
| EP | 0 851 681 A1 | 7/1998 |
| EP | 0 852 361 A2 | 7/1998 |
| WO | WO 97/41690 | 11/1997 |
| WO | WO 98/17064 | 4/1998 |
| WO | WO 98/31114 | 7/1998 |

OTHER PUBLICATIONS

New WebTV-based Internet Receiver FAQ, http://developer.webtv.net/itv/2.3-2.3.5/main.htm, pp. 1-4, Jun. 23, 1999.

New WebTV-based Internet Receiver FAQ, http://developer.webtv.net/itv/2.2.2/main.htm, pp. 1-6, Jun. 9, 1999.

Introduction to WebTV, http://developer.webtv.net/design/whydev/whydev.htm, pp. 1-2, May 13, 1999.

Interactive TV Link Checksum Tool, http://developer.webtv.net/itv/tvlink/main.htm, pp. 1-2, May 12, 1999.

Interactive TV Examples, http://developer.webtv.net/itv/examples/demo1/main.htm, pp. 1-4, Jun. 2, 1999.

Displaying TV in Web Pages, http://developer.webtv.net/itv/embedtv/main.htm, pp. 1-3, Jun. 9, 1999.

What is Interactive TV?, http://developer.webtv.net/itv/whatis/main.htm, pp. 1-5, Jun. 9, 1999.

Interactive TV Examples, http://developer.webtv.net/itv/examples/main.htm, p. 1, Jun. 9, 1999.

Interactive TV on WebTV and Windows 98, http://developer.webtv.net/itv/win98/main.htm, pp. 1-2, May 12, 1999.

Interactive TV Links, http://developer.webtv.net/itv/links/main.htm, pp. 1-7, Jun. 9, 1999.

WebTV Products, http://www.webtv.net/products/index.html, p. 1, by WebTV Networks, Inc.

WebTV—Plus, http://www.webtv.net/products/plus/index.html; pp. 1-2, by WebTV Networks, Inc.

WebTV—Plus Features, http://www.webtv.net/products/plus/wantmore.html, pp. 1-2, by WebTV Networks, Inc.

WebTV—Plus Features, http://www.webtv.net/products/plus/wantmore2.html, p. 1, by WebTV Networks, Inc.

WebTV—Plus Features, http://www.webtv.net/products/plus/wantmore3.html, p. 1, by WebTV Networks, Inc.

WebTV Classic—Features, http://www.webtv.net/products/classic/wantmore.html, p. 1, by WebTV Networks, Inc.

WebTV-Plus Specifications, http://www.webtv.net/products/plus/specs.html; pp. 1-2, by WebTV Networks, Inc.

WebTV—Questions and Answers, http://www.webtv.net/products/questions/index.html, pp. 1-9, by WebTV Networks, Inc.

WebTV Classic, http://www.webtv.net/products/classic/index.html, p. 1, by WebTV Networks, Inc.

WebTV Classic-Features, http://www.webtv.net/products/classic/wantmore2.html, pp. 1-2, by WebTV Networks, Inc.

* cited by examiner

Fig. 5

| URL Address | Settings for Primary Complimentary Channel | Settings for Secondary Complimentary Channel | Settings for Tertiary Complimentary Channel |
|---|---|---|---|
| http://www.aa.com | 7 | 8 | 13 |
| http://www.bb.com | 111 | 23 | Default PIP |
| http://www.cc.com | 4 | 12 | 36 |
| http://www.dd.com | 19 | Default PIP | |
| http://www.ee.com | 21 | 14 | 7 |
| http://www.ff.com | 8 | 13 | 22 |
| http://www.gg.com | 20 | Default PIP | |
| http://www.hh.com | 90 | 11 | 72 |
| http://www.ii.com | 12 | 36 | Default PIP |

Fig. 6

| URL Address | Settings for Primary Complimentary Channel | Settings for Secondary Complimentary Channel | Settings for Tertiary Complimentary Channel |
|---|---|---|---|
| http://www.aa.com | 7 | | |
| | | | Default PIP |
| | 4 | 12 | 36 |
| | 19 | Default PIP | |
| http://www.ee.com | | | |
| http://www.ff.com | | | |
| http://www.gg.com | | | |
| http://www.hh.com | | | |
| http://www.ii.com | 12 | 36 | Default PIP |

Fig. 11

| TV Channel | Primary URL Address | Secondary URL Address |
| --- | --- | --- |
| 7 | http://www.aa.com | http://www.jj.com |
| 8 | http://www.bb.com | http://www.kk.com |
| 9 | http://www.cc.com | http://www.ll.com |
| 10 | http://www.dd.com | http://www.mm.com |
| 11 | http://www.ee.com | http://www.aa.com |
| 12 | http://www.ff.com | http://www.aa.com |
| 13 | http://www.gg.com | http://www.bb.com |
| 14 | http://www.hh.com | http://www.nn.com |
| 15 | http://www.ii.com | http://www.oo.com |

| TV Channel | Primary Object |
|---|---|
| 7 | http://www.ad1.com |
| 8 | http://www.ad2.com |
| 9 | http://www.ad3.com |
| 10 | http://www.ad4.com |
| 11 | Generic Object |
| 12 | Secondary URL |
| 13 | Java Script Function |
| 14 | http://www.ad4.com |
| 15 | http://www.ad5.com |

Fig. 17

DISPLAYING COMPLEMENTARY CONTENT SOURCES

CROSS REFERENCE TO RELATED APPLICATIONS

This application is a continuation of U.S. patent application Ser. No. 09/495,333, filed on Feb. 1, 2000 now U.S. Pat. No. 6,757,707, which is incorporated by reference.

TECHNICAL FIELD

This application relates to displaying complementary sources of content.

BACKGROUND

The computer system 100 illustrated in FIG. 1 represents a typical hardware setup for executing software that allows a user to perform tasks such as communicating with other computer users, accessing various computer resources, and viewing, creating, or otherwise manipulating electronic content—that is, various combinations of text, images, movies, music or other sounds, animations, 3D virtual worlds, and links to other objects. The system includes various input/output (I/O) devices (mouse 103, keyboard 105, display 107) and a general purpose computer 109 having a central processor unit (CPU) 111, an I/O unit 113 and a memory 115 that stores data and various programs, such as an operating system 117 and one or more application programs 119. The computer system 100 also typically includes some sort of communications card or device 121 (e.g., a modem or network adapter) for exchanging data with a network 123 via a communications link 125 (e.g., a telephone line).

As shown in FIG. 2, a user of a computer system can access electronic content or other resources either stored remotely at one or more server systems 200 or locally at the user's own client system 202 (for example, a personal or laptop computer). An example of a server system 200 is a host computer that provides subscribers with online computer services such as e-mail, e-commerce, chat rooms, Internet access, and electronic newspapers and magazines. Users of a host computer's online services typically communicate with one or more central server systems 200 through client software executing on their respective client systems 202. A client system 202 may connect to a server through a modem 204 and a phone line 206, or through a direct connection 207 using a protocol such as TCP/IP.

In practice, a server system 200 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion. One such server system is "America Online 5.0" from America Online, Incorporated of Virginia.

A "browser" is an example of client software that enables users to access and view electronic content stored either locally or remotely, such as in a network environment (local area network (LAN), intranet, Internet). A browser typically is used for displaying documents described in Hyper-Text Markup Language (HTML) and stored on servers connected to a network such as the Internet.

A user instructs a browser to access an HTML document, or web page, by specifying a network address—or Uniform Resource Locator (URL)—at which a desired document resides. In response, the browser contacts the corresponding server hosting the requested web page, retrieves the one or more files that make up the web page, and then displays the web page in a window on the user's computer screen.

FIG. 3 is a screenshot of a browser application 300 (Microsoft Internet Explorer) displaying a typical HTML document, or web page 302. As shown therein, a single web page 302 may be composed of several different files potentially of different data types 304 (for example, text, graphics, images, virtual worlds, sounds, and movies). In addition, a web page can include links 306 pointing to other resources (for example, web pages or individual files) available on the network. Links 306 can take virtually any visual form. For example, they can appear either as a text string, a graphical image, or a combination of the two. Each link 306 has an associated URL pointing to a location on the network. When a user clicks on, or otherwise selects, a displayed link 306, the browser automatically will retrieve the web page (or other resource) corresponding to the link's associated URL and execute it or display it to the user.

Referring to FIG. 4, a "web-based TV" system 400 has been developed that makes dual usage of conventional TV sets 402. That is, a user of web-based TV can watch TV and/or view web pages and otherwise "surf" the Internet. In this regard, a special purpose computer 404, referred to as a "set top device," is used in connection with standard TV sets 402 for viewing web pages on the Internet. The set top device 404 essentially has the same basic components as the general purpose computer 100 illustrated in FIG. 1, except that it also includes a TV tuner 406 for receiving TV programming in the form of broadcast, satellite, and/or cable TV signals. The set top device 404 thus can selectively display two different sources of content (TV programming received by TV tuner 406 and web or network content received by communications card 121) on the TV monitor 402 connected to the set top device 404.

The web content displayed may be a program that is transmitted only on the Internet. For example, the programming may be a sports event for which a broadcast network has the viewing rights but decides not to broadcast the event. In such an instance, the broadcast network and an Internet-based TV provider may cooperate to transmit the event across the Internet. The programming also may be a continuous series of programming that is transmitted on the Internet and not otherwise broadcast.

Accessories may be added to the web-based TV system 400, such as, for example, a wireless keyboard 408. The wireless keyboard 408 can be similar to the keyboard 105 but it also may have specialized keys designed for use in the web-based TV system 400 to make viewing and web surfing easier. Additionally, a wireless remote control 410 may be used to control the set top device 404 and to facilitate channel surfing and web-based TV connections via various buttons 412, which may be specialized for the web-based TV environment.

An example of an existing web-based TV system 400 is "WebTV" by Microsoft. Information about WebTV service may be found at WebTV's various web pages, for example, at http://www.webtv.net and http://developer.webtv.net.

Users of web-based TV may subscribe to a cable TV provider. Cable TV providers typically provide users an Electronic Programming Guide (EPG), which is a listing of channels that are available to the subscribers of cable TV providers. Typically, an EPG is displayed on a channel (e.g., channel 3) dedicated for that purpose. FIG. 5 is an example of an EPG 500 from Yahoo!. As shown therein, a list of channels 501 is presented to users. The channels may be, for example, a combination of broadcast programming and Internet-based programming. The schedule 502 for each channel typically is presented as a list showing the next several hours of programming for each channel. The starting and stopping times 503 are presented as headers at the top of the list of channel schedules. The user may use the controls 504 to limit the number of channels presented. For example, by selecting the "Sci-Fi" category 505, the user can limit the set of channels presented to those showing science fiction programming. By using conventional graphical user interface (GUI) manipulation techniques, users of EPGs may be able to scroll through the list of channels, and may be able to scroll forward in time 506 to see the schedule for future programs. Users also may be able to select a channel to watch using the EPG.

Different cable TV providers may offer different EPGs. As a result, some channels may be available to subscribers of one cable TV provider that are not available to subscribers of another cable TV provider. A particular cable TV provider's collection of available TV channels is referred to as its "Channel Availability."

In general, a cable TV provider will provide its subscribers not only with a basic package of "free" channels that are included with the base price, but also with several "pay" (or "subscription") channels that subscribers optionally can elect to receive for additional charges. The collections of channels that a subscriber elects to receive typically form that subscriber's "channel line-up." The channels in the subscriber's line-up are referred to as the "subscribed channels" and those channels not selected are referred to as the "unsubscribed channels." For a particular subscriber, therefore, the available channels in the EPG are divided into the subscribed channels and the unsubscribed channels.

SUMMARY

In conventional web-based TV systems, viewers must separately designate for display a computer network content source (e.g., a specific TV channel). Using the present system and techniques, viewers need only designate one of the content sources and the web-based TV system will automatically select a complementary or related TV channel and/or web page. This capability is referred to as "Featured Tuning."

In one general aspect, Featured Tuning includes a computer-implemented method of displaying related sources of viewing content. The method includes receiving a user input specifying a URL address corresponding to a web page, determining a corresponding television channel and displaying the corresponding television channel.

Embodiments may include one or more of the following features. For example, receiving the user input specifying the URL address may further include executing a Java script function to specify the URL address. Specifying the URL address may include the user specifying the URL address.

Determining a corresponding television channel may include comparing the URL address to a list of television channels that includes at least a primary related television channel and selecting for display the primary related television channel. Determining a corresponding television channel may further include selecting for display a secondary related television channel if the primary related television channel is not available or is not one to which the user has subscribed and the user has subscribed to the secondary related television channel and that channel is available. Determining a corresponding related source of viewing content may further include selecting for display a generic page calling, a second URL address, or executing a Java script function, if neither the primary related television channel nor the secondary related television channel are available and part of the user's subscription.

Determining a corresponding television channel may further include one or more of selecting for display a text/graphics template based on the corresponding selected television channel, selecting for execution an HTML code based on the corresponding selected television channel, selecting for execution a Java script code based on the corresponding selected television channel, selecting for display an advertisement hot spot based on the corresponding selected television channel, and selecting for display a text/graphics template if neither the primary related television channel nor the secondary related television channel are available and part of the user's subscription. A HTML code or a Java script code may be selected for execution and/or an advertisement may be selected for display, based on the text/graphics template selected.

The computer-implemented method of displaying related sources of viewing content may further include receiving a user input specifying a user-selected television channel and displaying the user-selected television channel in place of the corresponding television channel. The method may further include receiving a user input specifying the first URL address corresponding to a web page and displaying the television channel corresponding to the first URL address.

The computer-implemented method of displaying related sources of viewing content may further include selecting for display on the video display an object relating to the displayed television channel. Selecting the object for display may include comparing the displayed television channel with a mapping of objects and selecting a primary related object corresponding to the displayed television channel. The primary related object may be a generic page or a generic object. Selecting the related object may include calling a second URL address and/or executing a Java script function.

In the computer-implemented method of displaying related sources of viewing content, determining a corresponding television channel may include performing a Channel Availability scan to create a list of channels available from the television provider, performing a subscription status scan from the list of channels available to create a list of subscribed channels, comparing the URL address to the list of subscribed channels, selecting for display the primary related television channel if the primary related television channel is on the list of subscribed channels, and selecting for display the secondary related television channel if the primary related television channel is not on the list of subscribed channels and the secondary related television channel is on the list of subscribed channels.

In another general aspect, a computer-implemented method of displaying related sources of viewing content includes receiving a user input specifying a television channel, determining a URL address corresponding to the television channel, and displaying a web page corresponding to the URL address.

In another general aspect, a system for displaying at least two sources of viewing content includes a set top box having instructions stored within the set top box. The instructions are for receiving a user input specifying a URL address corresponding to a web page, determining a corresponding television channel, and displaying the corresponding television channel.

In another general aspect, computer software stored in a computer-readable medium provides Featured Tuning between a URL address and a Feature Tuned channel. The software includes instructions for causing a computer system to perform the following operations: receive a user input specifying a URL address corresponding to a web page, determine a corresponding television channel, and display the corresponding television channel.

The system and techniques described here may provide one or more of the following features. For example, a web content screen can be designed to display content related to a subject matter selected for viewing by a user. The related content may include related advertising, which can be marketed at a premium because it will be viewed by users interested in that subject matter. The related content also may include information relating to a television channel available to a user but one which the user has not subscribed to. By viewing information about that channel, the user may be enticed to subscribe to that channel. The system and techniques also provide a distribution channel for Internet-TV providers and broadcast TV providers to distribute interactive content and advertising across local and national television line-ups. The distributed programming may be consistent across the nation and the associated advertising may be relevant to the programming. The programming may by leveraged because the system and techniques enable related offerings, such as information feeds, tickers, polling, contextual chats, targeted advertisements, instant Record/Remind functions, tags, games, and shopping.

In one general aspect, a computer-implemented method includes receiving a first URL address corresponding to a first web page, accessing content and serving the first web page based on the first URL address, receiving specification of a second URL address corresponding to a second web page, changing from the first web page to the second web page based on the received specification of the second URL address, motivating an automatic change in television channel from a first television channel to a second television channel based upon a change from the first web page to the second web page, and displaying the second television channel.

Implementations may include one or more of the following features. For example, the method may include browsing the Internet based on the second URL address to identify second content relevant to the second URL address, and displaying the second content. The method also may include receiving the identified content from a source other than a broadcast signal. The method may include browsing the Internet based on the first URL address to identify first content relevant to the first URL address, displaying the first content, determining the first television channel based on the first URL address, and displaying the first television channel.

Motivating an automatic change may include determining the second television channel based upon the second URL address and changing the television channel from the first television channel to the second television channel in response to receipt of the second URL address. In one implementation, the method may include browsing the Internet based on the second URL address to identify second content relevant to the second URL address, and displaying the second content, where determining the second television channel includes determining the second television channel including television content relevant to but different from the second content. In another implementation, the method may include receiving a user input specifying a user-selected television channel having television content different from and unrelated to the second television channel, and displaying the user-selected television channel in place of the second television channel and concurrently displaying the second content relevant to the second URL address.

In one implementation, determining the second television channel may include performing a channel availability scan to create a list of channels available from the television provider, performing a subscription status scan on the listed channels available to create a subset list of subscribed channels, identifying a primary related television channel based on the second URL address, determining whether the primary related television channel is one of the listed subscriber channels, if so, selecting, for display, the primary related television channel, if not, identifying a secondary related television channel based on the second URL address, determining whether the secondary related television channel is one of the listed subscriber channels, and if so, selecting, for display, the secondary related television channel.

In another implementation, determining the second television channel includes comparing the second URL address to a list of television channels including at least a primary related television channel, and selecting, for display, the primary related television channel. Determining the second television channel may further include determining whether the primary related television channel is available, and if not, identifying a secondary related television channel based on the second URL address, determining whether the secondary related television channel is available, and if so, selecting, for display, the secondary related television channel. If the secondary related television channel is not available a third URL address may be called, a Java script function may be executed, or a text/graphics template may be selected for display. In addition, an HTML code based on the text/graphics template selected may be selected for execution, a Java script code based on the text/graphics template selected may be selected for execution, or an advertisement based on the text/graphics template selected may be selected for display.

In some implementations, a text/graphics template based on the second television channel may be selected for display, an HTML code based on the second television channel may be selected for execution, a Java script code based on the second television channel may be selected for execution, or an advertisement hot spot based on the second television channel may be selected for display.

Receiving the user input specifying the second URL address may include executing a Java script function to specify the second URL address. Specifying the second URL address may include specifying the second URL address based on input received from a user.

Some implementations also may include receiving a user input specifying a user-selected television channel having content different from the second television channel, and displaying the user-selected television channel in place of the second television channel and concurrently displaying second content relevant to the second URL address. One implementation further includes receiving a user input specifying the second URL address and displaying the second television channel. Another implementation further includes selecting, for display on the video display, an object relating to the second television channel. Selecting the object for display may include comparing the second television channel with a mapping of objects and selecting a primary related object corresponding to the second television channel.

Other features will be apparent from the description and drawings, and from the claims.

DESCRIPTION OF THE DRAWINGS

Figure 5:
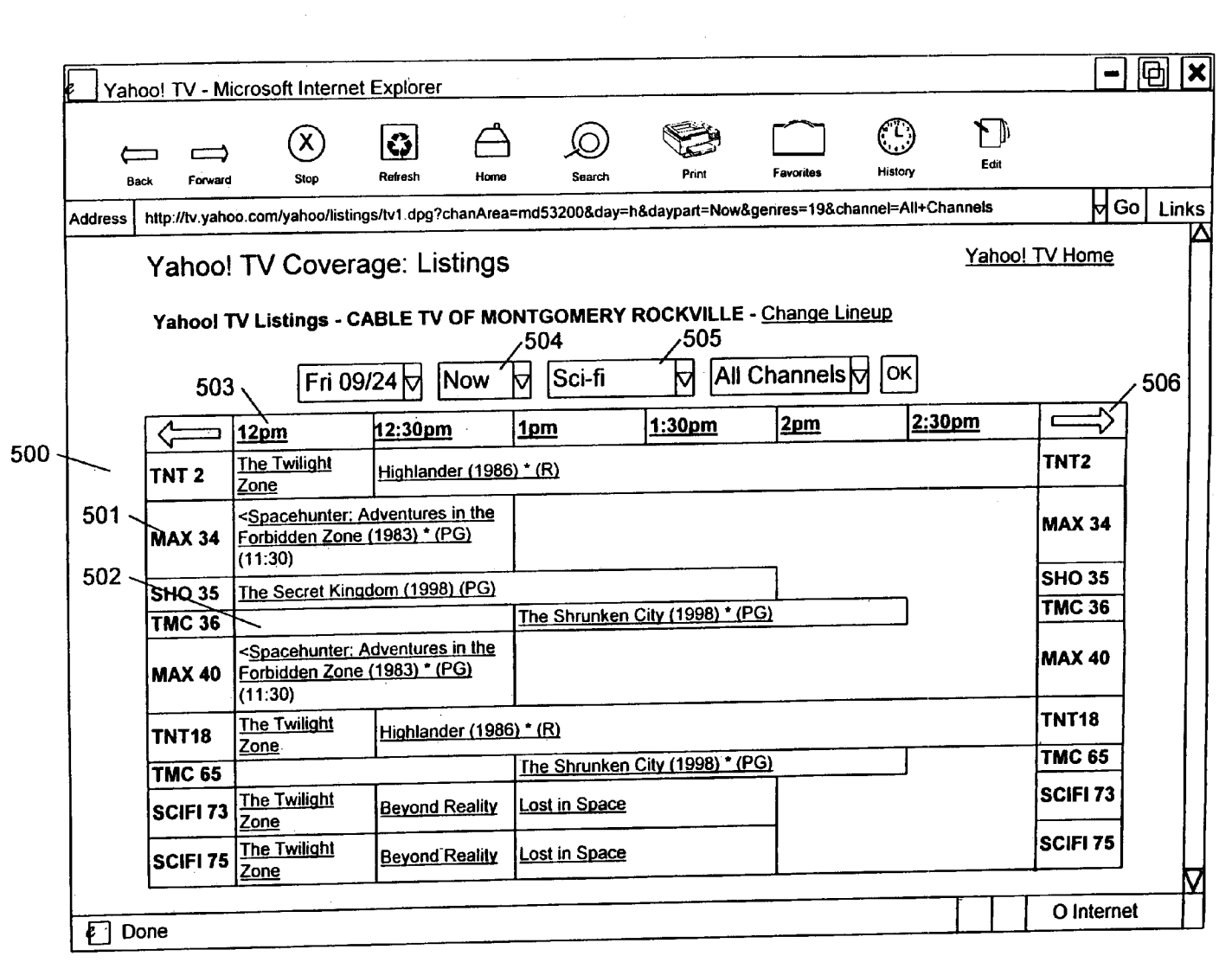

FIG. 5 is a screenshot of an electronic programming guide.

FIG. 6 is a data table that includes mapped pairings of URL addresses and TV channels or default screens.

FIG. 11 is a partially complete data table, as would be displayed to a user, that includes mapped pairings of URL addresses and TV Channels or default screens.

FIG. 15 is a data table that includes mapped pairings of TV channels and URL addresses.

FIG. 17 is a data table that includes mapped pairings of TV channels and URL addresses used in Differentiation by Channel Availability

DETAILED DESCRIPTION

Figure 1:
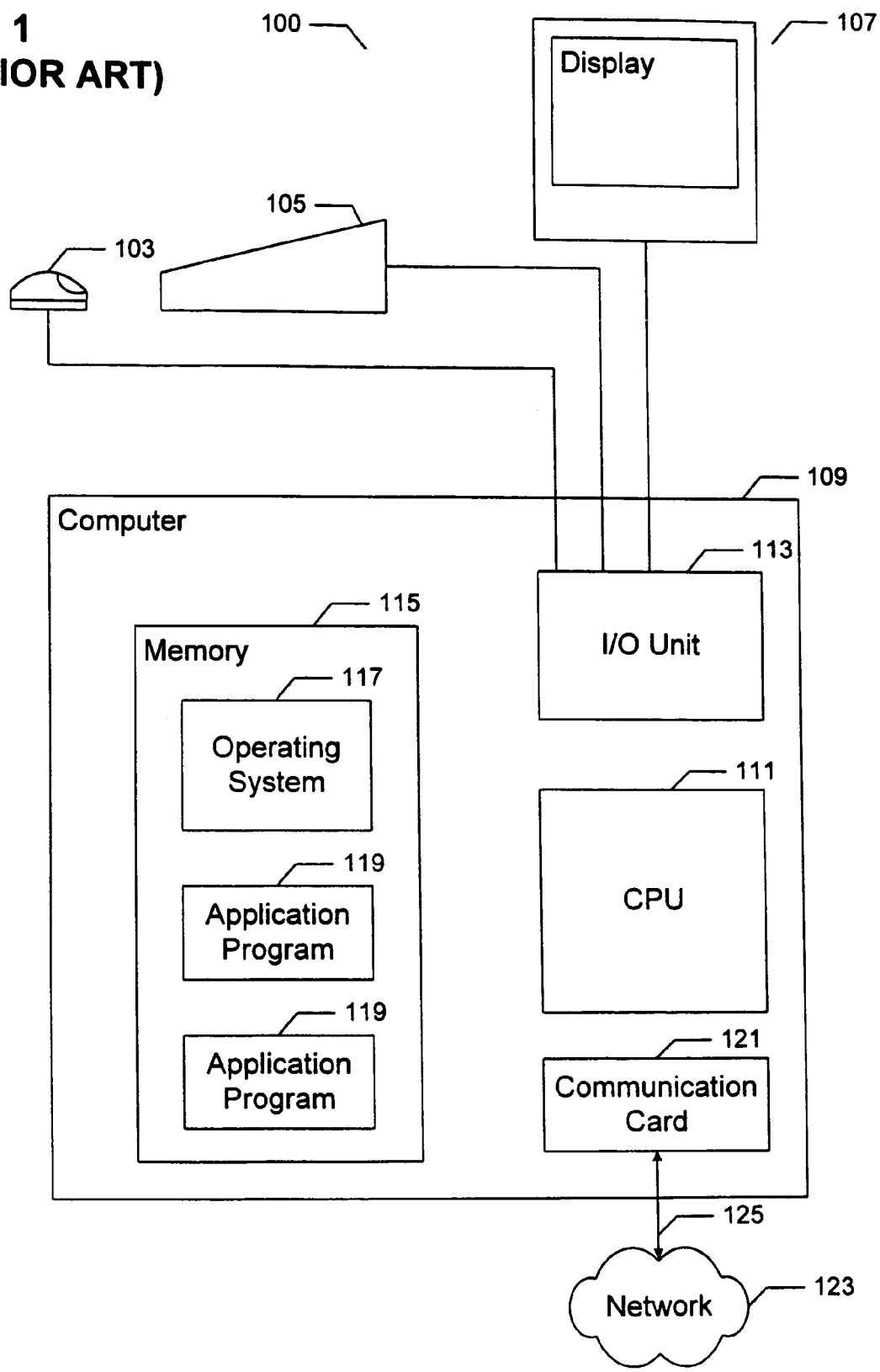
FIG. 1 is a block diagram of a computer system.
Figure 2:
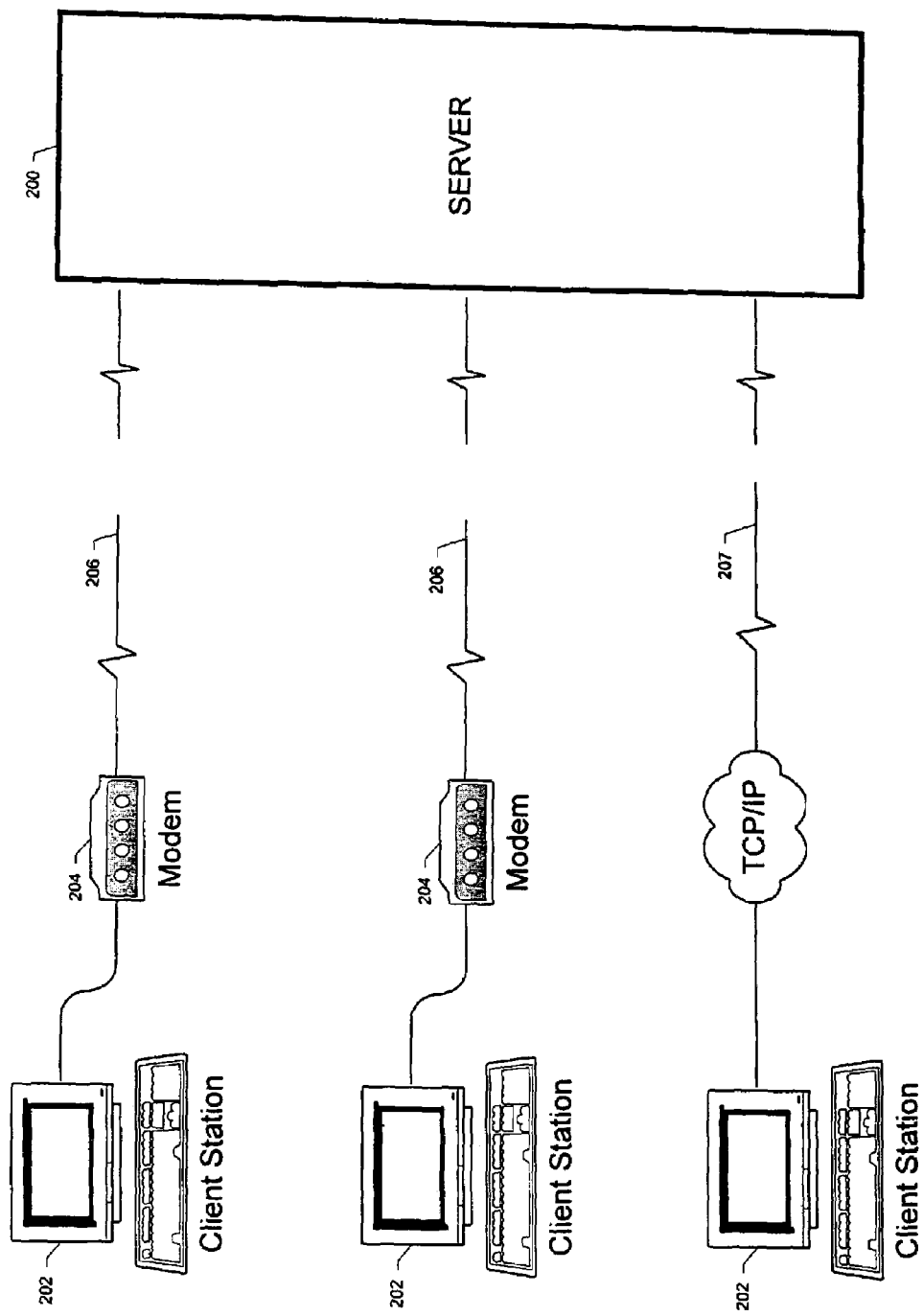
FIG. 2 shows a typical network computing environment.
Figure 3:
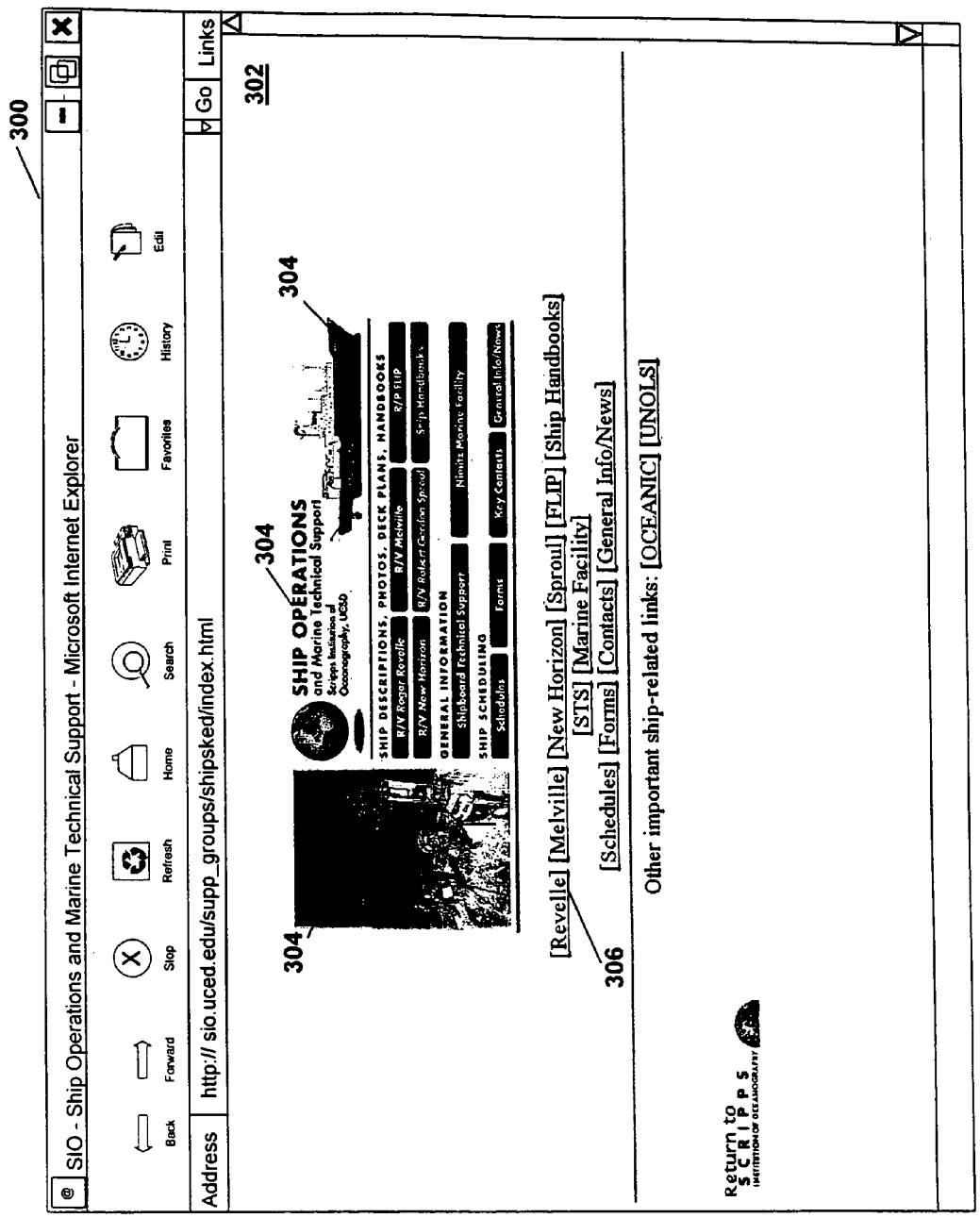
FIG. 3 shows a screenshot of a browser displaying a web page.
Figure 4:
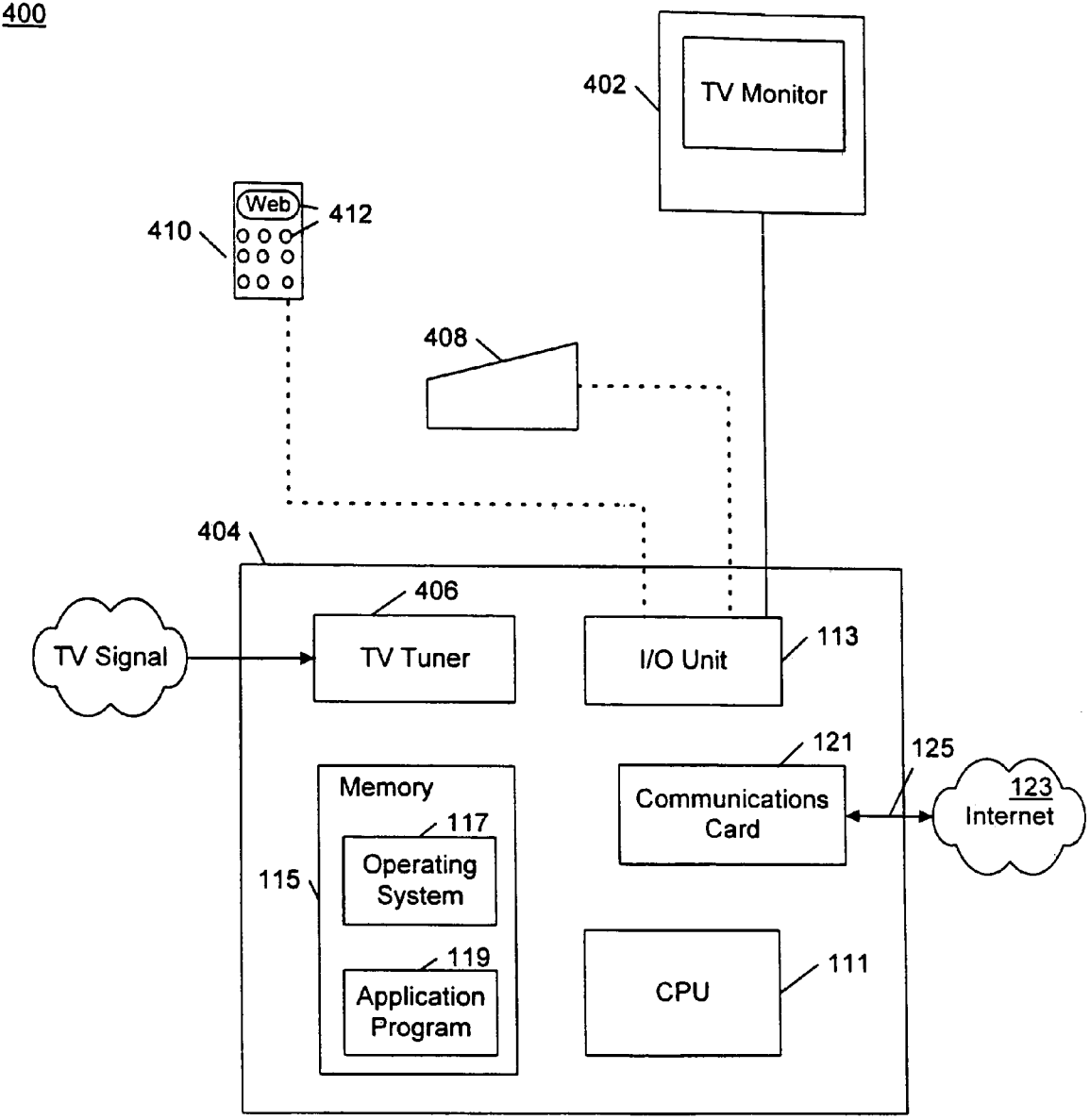
FIG. 4 is a block diagram of a set top device.

A web-based TV provider or an Internet-content provider can control the simultaneous display of web content and TV channels to cause a TV channel to be displayed when a particular web page is viewed. This control is provided using functions such as Content Differentiation by Channel Lineup, Featured Tuning, Channel Scan, and Differentiation by Channel Availability. "Content Differentiation by Channel Lineup" is the ability to create web pages such that viewers of those web pages with differing cable TV Channel Lineups potentially will view different content on those web pages. Content Differentiation by Channel Lineup can be used to provide users with multiple sources of coordinated or related content (i.e., complementary content) whether or not the various content sources are independent of one another. Content Differentiation by Channel Lineup is implemented using a variety of functions, such as Featured Tuning, Channel Scan, and Differentiation by Channel Availability. These functions use mappings between URL addresses, TV channels, and objects, such as hyperlinks and advertisements, to cause complementary content to be displayed based on the content accessed by the user. "Featured Tuning" is the ability to change a TV channel displayed in the picture-in-picture (PIP) window on a monitor to a selected TV channel. Featured Tuning can be used with other functions to decide what TV channel or object, such as an advertisement or hyperlink, to display on a web content screen and then to display that TV channel or object. Featured tuning may include a system and various techniques whereby viewers need only designate one of the content sources and the web-based TV system will automatically select a complementary or related TV channel and/or web page. "Channel Scan" is the ability to determine what channels are available in a TV viewer's Channel Lineup. "Differentiation by Channel Availability" is the ability to decide what object (e.g., TV channel, advertisement, hyperlink) to display on a web content screen based on the availability and/or subscription status of a particular TV channel. Content Differentiation by Channel Lineup also takes into account that different users will have different sources of content available, and further, may have chosen to receive different content even if the same content sources are potentially available.

FIG. 6 is an example of a data table 510 that includes mapped pairings of URL addresses 511 and TV channels 512 or a default screen 513, and provides an example of how Content Differentiation by Channel Lineup may be implemented. The URL addresses 511 and the TV channels 512 may be complementary of the other. The data table is programmed into a set-top box such that clicking on one of the URL addresses listed in the table while on the Internet causes the "selected" mapped TV channel or default screen to be displayed (i.e., Featured Tuning) in a window (referred to as a "picture-in-picture" or "PIP") on a computer monitor. The mapping can be specified by an Internet content provider and downloaded from a host computer, or it can be specified locally by the user. The Internet content provider (e.g., a web site operator, online service provider (OSP), web-based TV provider (which might be the same as the OSP)) typically is not the same as the TV service provider (e.g., cable TV provider, satellite TV provider multiple broadcast TV networks) and each operates independently of the other.

In FIG. 6, Featured Tuning is used to provide users with multiple sources of coordinated or related content (i.e., complementary content) that come from content sources that may be, but are not required to be, independent of one another. For example, Internet content providers may create a content screen that is complementary to the content of a mapped TV channel that appears in the PIP window on the content screen when the URL address is initially accessed.

Figure 7:
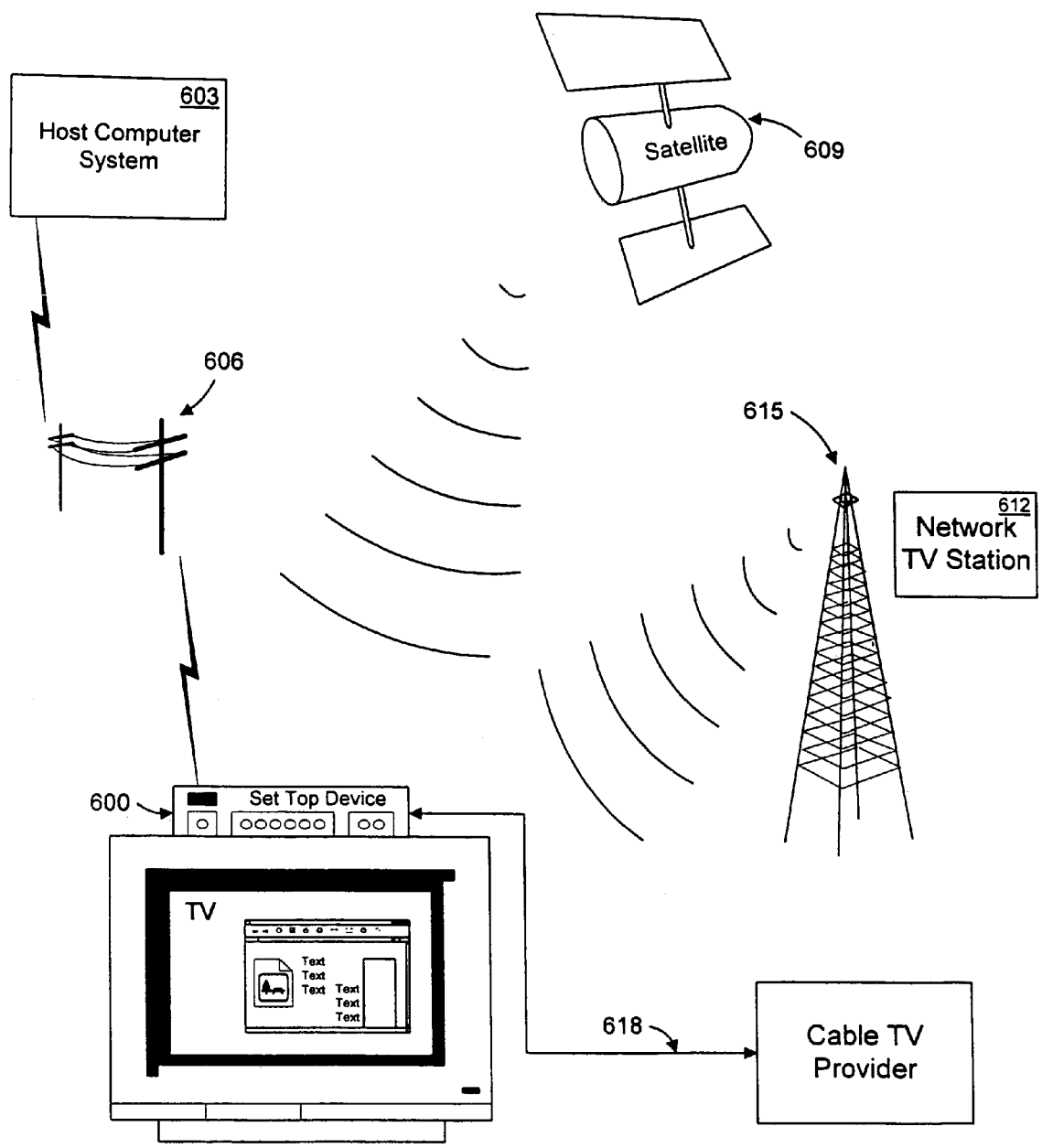
FIG. 7 is a diagram showing various sources of information available to a set top box in a web-based TV system.

Referring to FIG. 7, a set top box 600 may use any or all of a variety of methods to gather web content and TV content from any of several different sources. As illustrated, the set top box 600 can gather content from a host computer system 603 (e.g., a web-based TV service provider) via a public or private network and telephone lines 606, from a satellite 609 or a network TV broadcast 612 using microwave or wireless communications 615, or from a cable TV provider by means of direct cabling 618. The transport means shown in FIG. 7 are exemplary only, and are not necessarily comprehensive. In general, essentially any available transport mechanism may be used to gather content from multiple sources.

Figure 8:
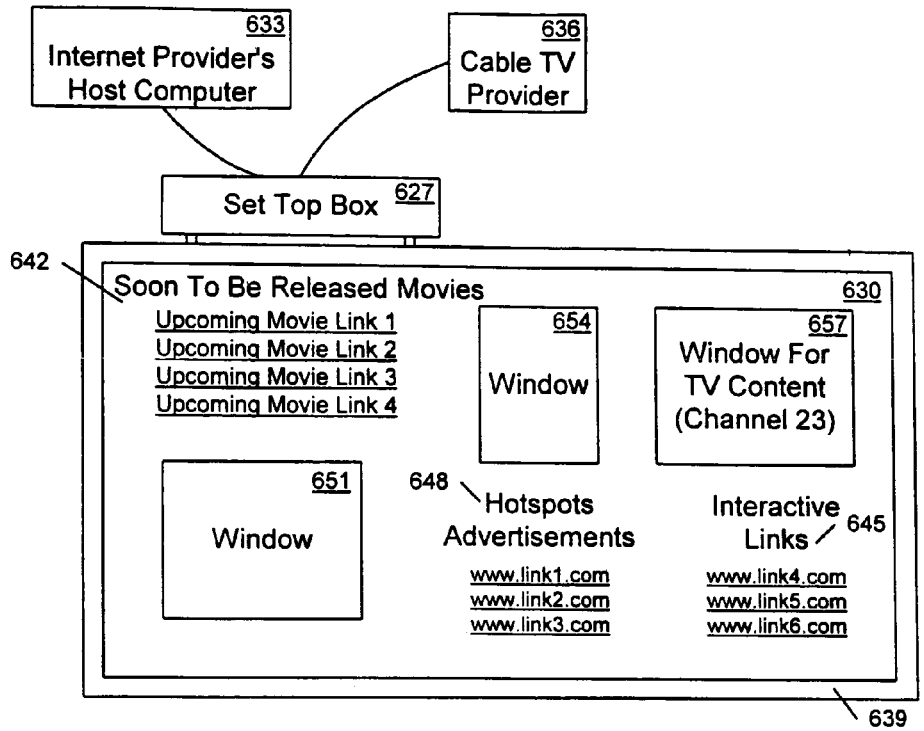
FIGS. 8–10 are mockups of screenshots of Featured Tuning between a web page and a cable television channel in a web-based TV environment.
Figure 9:
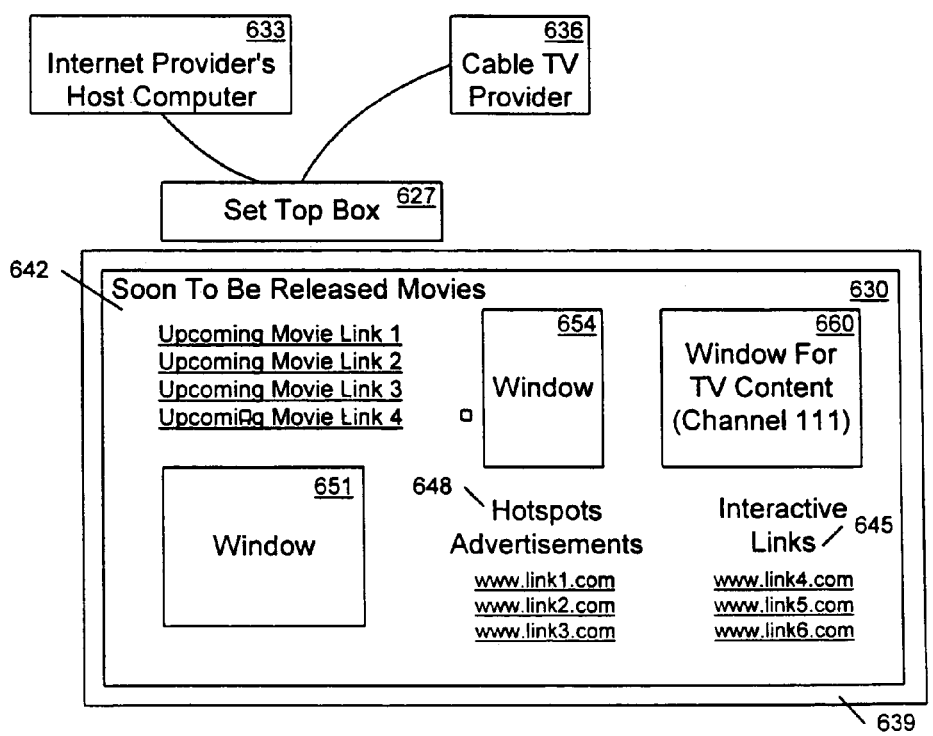
Figure 10:
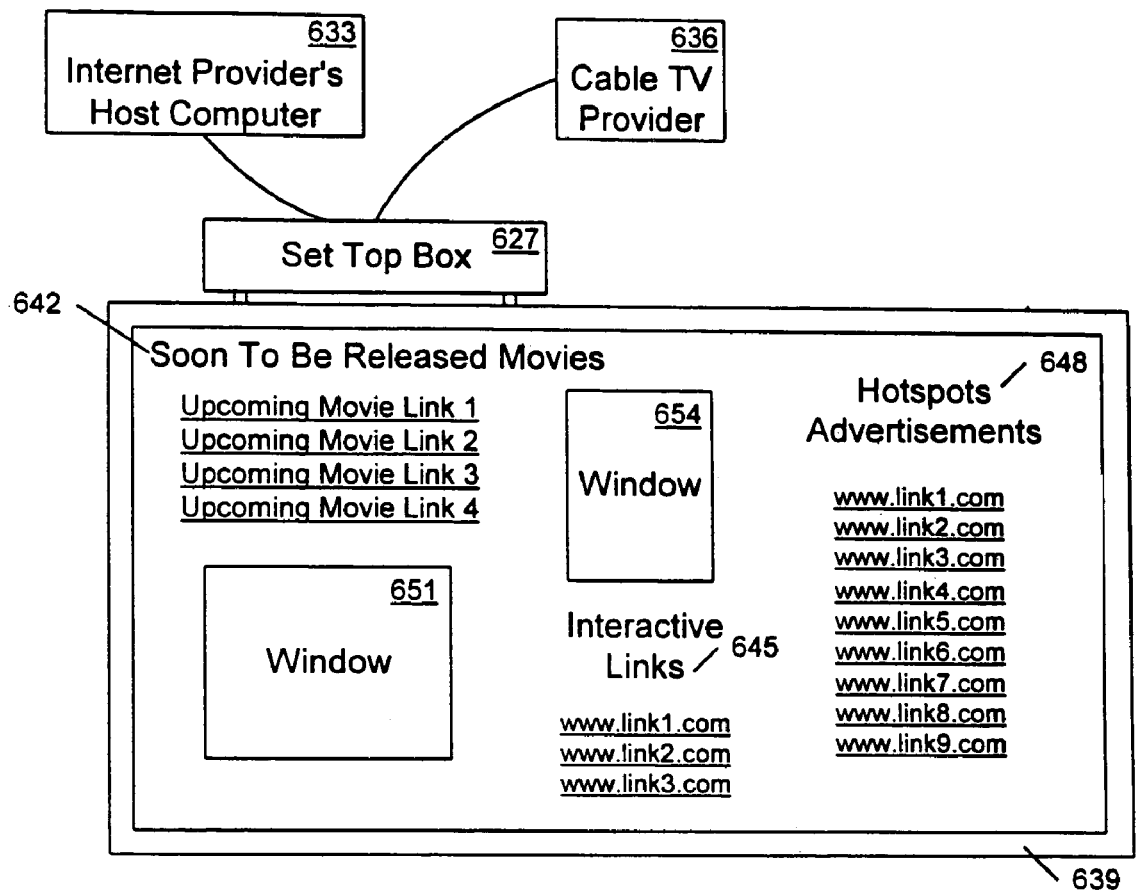

FIGS. 8–10 are mockups of screenshots showing examples of web pages with a TV content overlay and displaying content directly from a set-top box 627. For example, FIG. 8 is a mockup of a screenshot of a "content screen" or "Internet-based TV page" 630 as it would be viewed by a user who subscribes to an Internet provider 633 and a cable TV provider 636. Content screen 630 is a mosaic or tapestry of multiple content sources. Set-top box 627 receives content from multiple sources (cable TV provider, satellite TV, computer network, broadcast TV signals, etc.) and can combine or otherwise manipulate the received content for display on a TV monitor 639. Based on the input received from the set-top box 627, the TV monitor 639 is capable of simultaneously displaying content from two or more of the various content sources. For example, in the screen shot 630, web-page content can be displayed in the background (e.g., a listing of soon-to-be released movies 642) while other computer network content (e.g., links 645 and/or advertisements 648, which can be generated locally by the set-top box 627, received from the host computer 633, or from a URL) can be displayed in display regions (e.g., windows 651 and 654) overlaid on the background content. Additionally, TV content can be displayed in yet another window 657, the PIP window overlaid on the background content.

The particular content screen 630 in the example of FIG. 8 is directed to movies and therefore includes complementary content, such as the movie listing 642 in the background, the TV PIP display 657 of a movie channel, the column of interactive links 645 to movie-related web pages, and the interactive hotspot 648 (a user-clickable link to a specified resource (e.g., a URL on the Internet) displaying advertising). Referring again to FIG. 6, if the web page accessed and displayed in content screen 630 is http://www.bb.com, the display 657 contains complementary channel 111, a movie channel, if that channel is available. The set-top box 627 can use various Featured tuning techniques to automatically select and display complementary or related content.

That is, each or any of the various content sources (e.g., listing 642, movie channel 657, interactive links 645, hot spot advertisements 648) displayed in FIG. 8 can be altered automatically by the set-top box 627 or selected in the first instance automatically by the set-top box based on one or more content choices made by the user. Alternatively, or in addition, Featured tuning can be based on a user's Channel Availability and/or on predetermined pairings of TV channels and web pages stored by the set-top box or the host computer. When the user selects the URL address associated with a particular web page (for example, the web page from which the listing 642 was retrieved), software or hardware in the set top box is used to select and display a complementary TV channel, for example, the movie channel. To accomplish this, the set-top box is programmed to compare the user-selected URL address to a list of predetermined channels that are eligible for display in the PIP, and then to display a corresponding channel.

As described in FIG. 8 above, the user has a Channel Lineup that includes the movie channel, which is the primary complementary channel and is displayed in the PIP window when a particular URL address is accessed. If another user does not have the movie channel as one of its subscribed channels, another complementary channel, the secondary complementary channel, is displayed. For example, if the movie channel is a premium cable channel and a subscriber has not subscribed to that channel, a secondary complementary channel is displayed. If the secondary channel is not available, a tertiary complementary channel is displayed. Multiple complementary channels can be mapped with an URL address and the software in the set-top box can be configured to compare the complementary channels to the user's EPG to select the channel to display. The software can be programmed to cause there to be no PIP if there are no complementary channels. The software also can be programmed to display an ad as a substitute for the PIP if there are no complementary channels.

More specifically, FIG. 9 illustrates a screenshot of the content screen 630 of FIG. 8 as might be viewed by a viewer having the pairings of FIG. 6 who is not a subscriber of the premium movie channel (channel 111 of data table 510 of FIG. 6) that is selected by the Internet content provider as the primary complementary channel. The screenshot 630 is the same except that a PIP window 660 displays a secondary channel, an entertainment channel (channel 23) from cable TV, instead of the PIP window with the movie channel (channel 111).

When the user selects the URL address associated with the screen content 630, software or hardware in the set-top box 627 compares the requested URL address to a list of channels mapped to that address to determine if the primary complementary channel is available and subscribed. If not available or subscribed, the software goes through the mapping until a complementary channel is displayed or no PIP window is displayed. Although the software will be the same for each set-top box, the mapping between URL addresses and complementary channels may vary between individual users based on a number of reasons, such as (1) geographic locale; (2) time zone; (3) identity of user's cable TV provider; (4) user's specified channel line-up; and (5) user-selected preferences. The mappings can be modified by downloading new information from a host computer, or locally by the user.

FIG. 10 illustrates a screenshot showing content screen 630 as it would be viewed by a broadcast TV user who does not have a subscription to either of the movie or entertainment channels used as the primary and secondary complementary channels, respectively, above. Based on this user's available TV programming, the Internet content provider has decided that there is not a related channel and, therefore, has not selected a tertiary complementary channel for inclusion in the mapping table. This decision making is implemented by downloading data from the host computer to the user's set-top box. Thus, when the broadcast TV user selects the URL address (http://www.bb.com) associated with content screen 630, and the software or hardware in the set top box 627 compares the URL address to the mapped complementary channels (see FIG. 6) and finds that a complementary channel is not mapped for that URL address, a default PIP will be displayed. The default PIP may be a rearrangement of the content screen 630 to fill the space in which the PIP window normally would be displayed. The rearrangement could include increasing the size or prominence of the advertising hotspot 648, as illustrated in FIG. 10.

The above Featured Tuning examples are based on mapped pairings between URL addresses and TV channels. The mapping may be created, for example, by Internet content service providers, Internet-based TV service providers, or users of either service. Internet or Internet-based TV service providers may download the mapping into the set top box and store it in memory there. Referring to FIG. 11, users may be prompted to complete a partially complete mapping table 660 that lists primary, secondary, and tertiary TV channels 663 and/or URL addresses 666, and allows users to complete the mapping by entering their preferred channels and/or URL addresses into corresponding unmapped pairing boxes 669. The mapping table 660 may include a list of complementary primary, secondary and tertiary channels 672 without a paired URL address 675. The table 660 also may include a completed pairing 678 of complementary channels mapped with a corresponding URL address. The table also may include a partially completed pairing 681 that includes a URL address and a primary complementary channel, where users are prompted to enter the secondary and tertiary paired channels. In partially complete mapping table 660, the Internet or Internet-based TV service provider has some input as to the pairings but permits users also to have input into the pairings. This may be useful, for example, for users that view web pages that have not been mapped by service providers and who want to take advantage of Featured Tuning.

Figure 12:
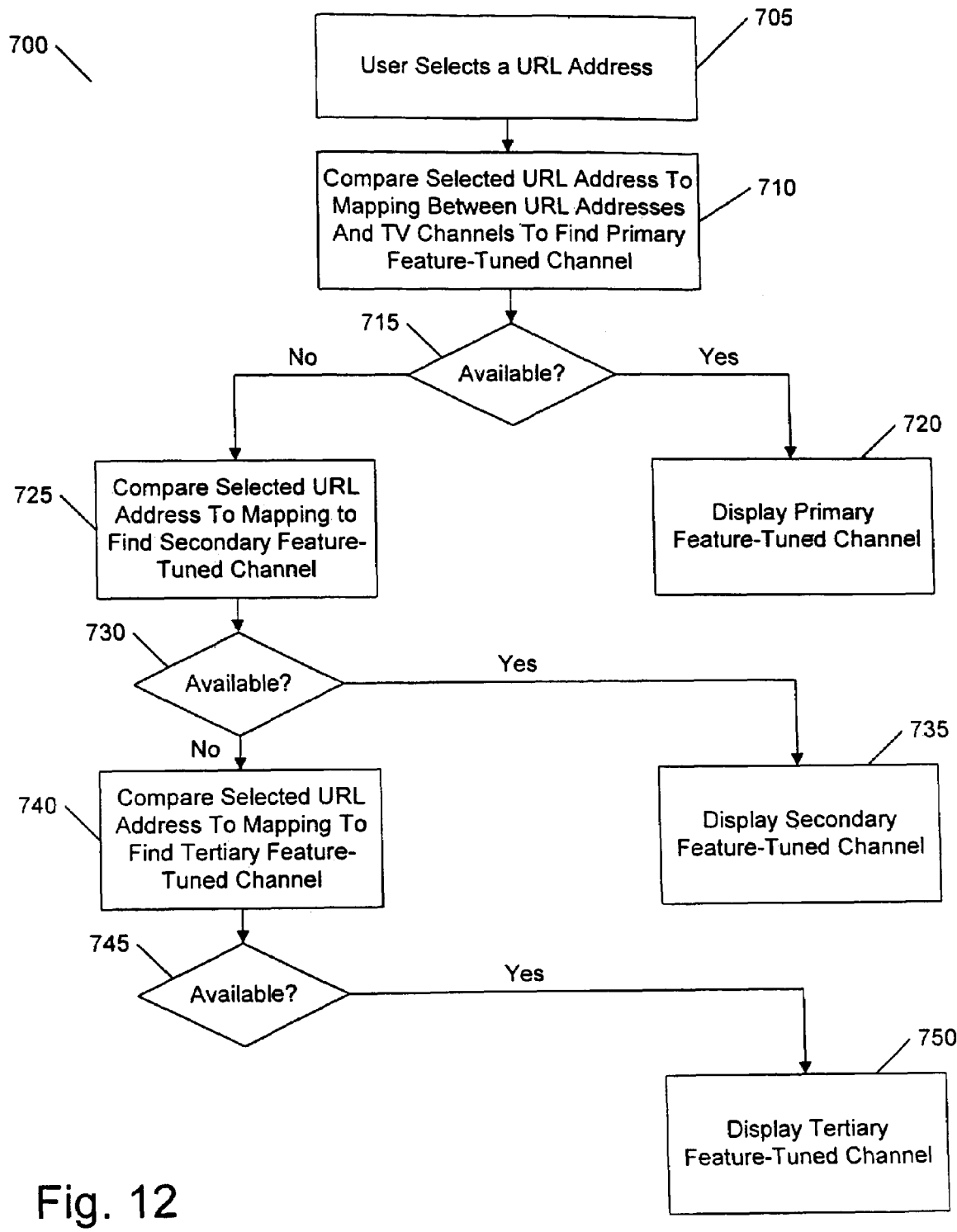
FIG. 12 is a flow chart showing the decision making process of the Featured Tuning function.

In general, Featured Tuning that implements mapped pairings between URL addresses and TV channels follows a flow chart 700 as illustrated in FIG. 12. Initially, a user selects a URL address (step 705) that causes software or hardware in the set top box to compare the selected URL address to a mapping between URL addresses and TV channels to find a primary Feature Tuned channel (step 710). If that channel is available (step 715), it is displayed (step 720). If the primary Feature Tuned channel is not available (step 715), the software or hardware compares the selected URL address to the mapping to find a secondary Feature Tuned channel (step 725). If that channel is available (step 730), it is displayed (step 735). If the secondary Feature Tuned channel is not available (step 730), the software or hardware compares the selected URL address to the mapping to find a tertiary Feature Tuned channel (step 740). If that channel is available (step 745), it is displayed (step 750). The mapping and software/hardware can be created such that a search is made only for a primary Feature Tuned channel or for even more levels of channels.

Figure 13:
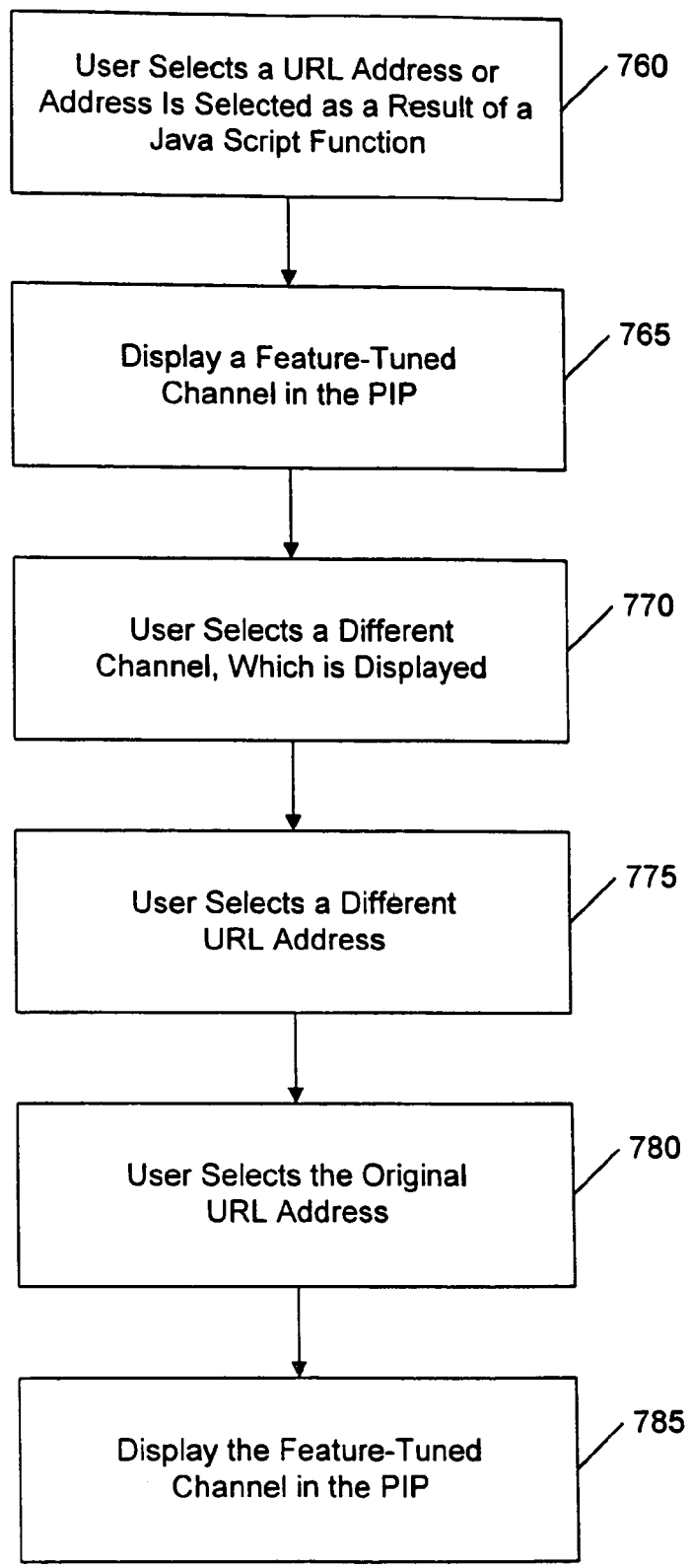
FIG. 13 is a flow chart illustrating how a Feature Tuned channel is displayed upon accessing a URL address.

FIG. 13 illustrates an example showing that Featured Tuning can be used to cause a default Feature Tuned channel to be displayed in the PIP window under a variety of circumstances. This capability provides assurance to the Internet-based TV provider that a particular mapped channel always will be displayed at the time that the respective mapped URL address is accessed, although the Feature Tuned channel can subsequently be changed. Initially, a user selects a URL address (step 760), such as the URL address of a gardening website. Alternatively, the URL address may be called as a result of a Java script function executed from a different content screen. Next, a Feature Tuned TV channel, which has been mapped with the URL address specified by the user, is displayed in the PIP window when that URL is selected (step 765). At that point, the user can select a different channel for display in the PIP (i.e., the user can override the Feature Tuned choice of TV channels) (step 770). The user then may decide to select another URL address for viewing (step 775).

When the other URL address is accessed and the corresponding content screen is displayed, a corresponding Feature Tuned channel will be displayed. If the Featured Tuning Function has not been set to display a channel when the other URL address is accessed, a channel will not be displayed in the PIP window. This may be the case if the Internet-based TV provider does not have a program in its lineup that has content similar to the other web page and chooses not to map a channel to that URL address. It also may be the case that, because of the large number of URL addresses, a Internet-based TV provider may not have the interest or resources to map every URL address with a channel. After viewing the content of the different URL address, the user may again select the originally selected URL address (step 780), which causes the Feature Tuned channel to be displayed again in the PIP (step 785). To reiterate, Feature Tuning can be set such that accessing URL addresses causes selected Feature Tuned channels to be displayed in the PIP window whether or not the user is accessing that URL address for the first time in a viewing session, after initially viewing that URL address and then selecting other URL addresses, or under other conditions.

Figure 14:
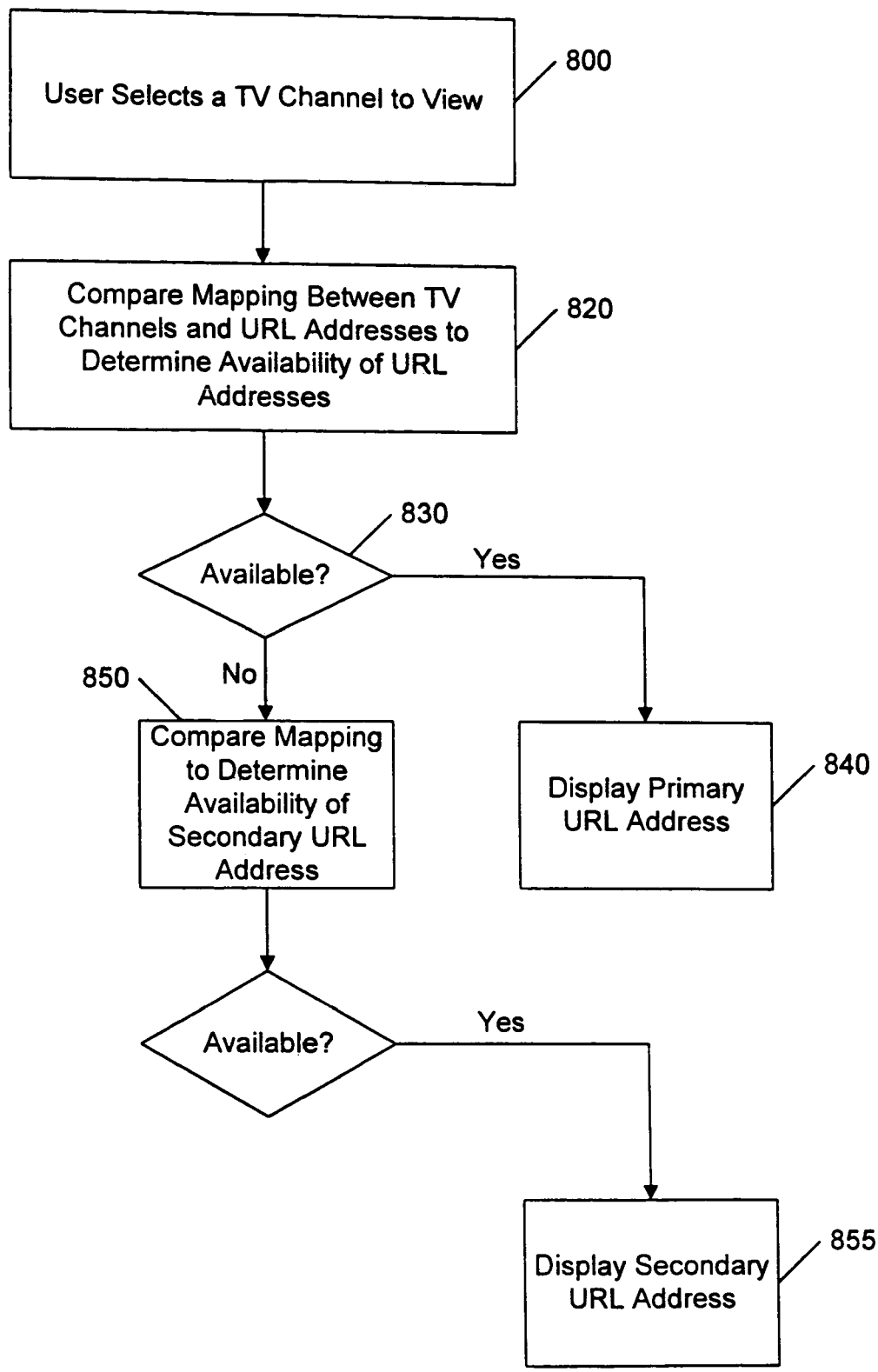
FIG. 14 is a flow chart showing an example of a reversed Featured Tuning function used to determine which URL address to display based on a TV channel.

FIGS. 14 and 15 illustrate another implementation of Featured Tuning in which Featured Tuning functions in a manner that is reverse to the implementations previously illustrated. In FIG. 14, the user selects a TV channel to view (step 800), which causes the set top device to compare a mapping 805 (FIG. 15) between TV channels 810 and URL addresses 815 (step 820) to Feature Tune a corresponding, primary URL address 825 (step 830) based on the selected TV channel 835. If the primary URL address 825 is available, it will be displayed (step 840). If it is not available, for example, through blocking or because it is not functioning, the set top box searches the mapping for a secondary URL address 845 (step 850), which is then displayed (step 855) if available. Other levels or URL addresses also may be mapped to the TV channel. This implementation can be used as a separate function. It also can be implemented, for example, with the method illustrated in the Feature Tuning example described above in FIG. 13, step 775, in which the user selects a different URL address to view. Implementing this "reverse" Featured Tuning ensures that the web page content displayed with the user-selected channel is complementary to that channel.

The examples shown in FIGS. 6–15 provide illustrations of using Featured Tuning to implement Content Differentiation by Channel Lineup so as to vary the TV channel displayed in the PIP window or elsewhere on web content screens. Content Differentiation by Channel Lineup also can be implemented using Differentiation by Channel Availability so that web-based TV service providers can provide or publish a screen of content in such a way that the content displayed can be varied as a function of the cable channels available and subscribed to by a subscriber of a cable TV provider.

Figure 16:
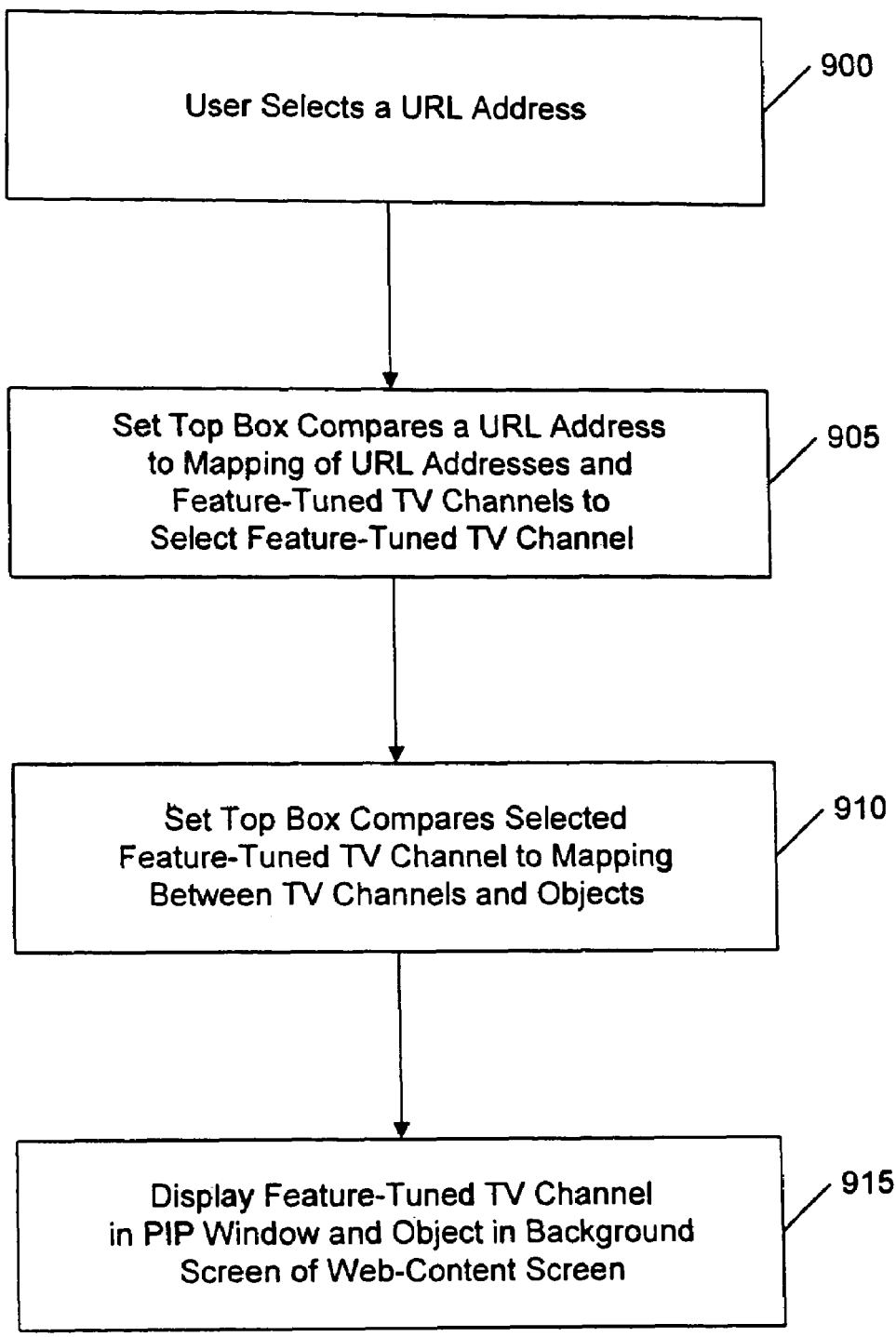
FIG. 16 is a flow chart showing an example of Differentiation by Channel Availability used to determine what object to display in a web content screen.

FIGS. 16 and 17 illustrate one example of "Differentiation by Channel Availability," in which the decision making method is used to decide what object, such as a URL address corresponding to an advertisement or a hyperlink to related subject matter content, to display in the web content screen. The decision making method is based on a specific TV channel's status, i.e., availability of the channel in the user's line-up. Initially, a user selects a URL address (step 900), which causes the set top box to perform the Featured Tuning function to select a Feature Tuned channel for display in the PIP window (step 905), as described above. The set top box may be programmed with a mapping as illustrated in FIG. 6. The set top box then determines what object is mapped with the Feature Tuned channel (step 910). The corresponding object will then be displayed along with the Feature Tuned channel (step 915). Referring to FIG. 17, the set top box is programmed with a mapping 918 that includes TV channels 921 mapped with objects 924. The objects 924 may be, for example, advertisements 927; generic objects 930, such as a logo of the Internet-based TV service provider; secondary URL addresses 933; or Java script functions 936. Typically, the object displayed has a complementary relationship with the URL address and its mapped Feature Tuned channel. For example, if the URL address is to a gardening web page, the Feature Tuned channel may be to a TV channel devoted to gardening and the displayed object 924 may be an advertisement for gardening implements or a link to another related gardening web page. Although only a primary object 924 is shown in FIG. 17, additional objects may be displayed with the primary object. For example, a second advertisement that is complementary to the Feature Tuned channel might be displayed in a different region on the web-content screen.

Typically, the object mapped with a channel, and displayed when that channel is displayed, will be based on whether the TV channel is a national entity (e.g., NBC, CBS, ABC, Fox) or a local affiliate (e.g., Washington, D.C. channel 4) of a national entity. For example, if the Feature Tuned channel is a CBS station that is broadcast nationwide by cable providers, the object associated with the channel may be a link to a listing and schedule of movies that will be broadcast by CBS to its affiliates over the next week. If the Feature Tuned channel is a local CBS affiliate viewed only in its local region and no object has been mapped to the local affiliate, the object displayed will default to the object mapped to the national entity, i.e., to the link to the listing and schedule of nationally broadcast CBS movies. If an object has been mapped to the local affiliate, that object will be displayed when the local affiliate is displayed.

Because the Differentiation by Channel Availability decision making function is programmed into a set top box, the function is not specifically associated with an Internet user or that user's Internet account. Thus, if two Internet users at different times access the Internet through the same set top box, both users will view the same Feature Tuned channels and objects selected by Differentiation by Channel Availability associated with the same URL addresses. This is in contrast to the situation where two users in different geographic regions with different subscribed channels access the same URL address but may see different TV channels in the PIP window and objects displayed on the web page. This difference results from the function being programmed to display channels based on whether that channel is available and part of the user's subscription. If a channel is not available and part of the user's subscription because, for example, of regional differences in Channel Availability, another channel will be displayed. As illustrated in FIG. 17, objects are mapped to channels and, therefore, the object displayed will be the object mapped to the channel displayed.

One rationale for this method of differentiation is that the relevant interests of people viewing the same channel are likely to be similar. Thus, for example, two people viewing a Feature Tuned travel channel are likely to be interested in travel and also are likely to be interested in viewing complementary objects, such as objects directed to travel. Consequently, two people using the same set top box to access a web page relating to travel, and which is mapped to a Feature Tuned channel relating to travel, are likely to be interested in viewing an object related to travel. Numerous other examples exist of channels directed to a narrow topic likely to be viewed by people having similar interests in some areas, such as channels directed to the weather, wrestling, gardening, or politics. Accordingly there is a significant probability that objects directed to certain topics will be of interest to viewers of complementary channels that relate to associated topics and, therefore, there is a benefit to creating the mapping between complementary URL addresses, Feature Tuned channels and objects in a set top box in a manner independent of the user.

Figure 18:
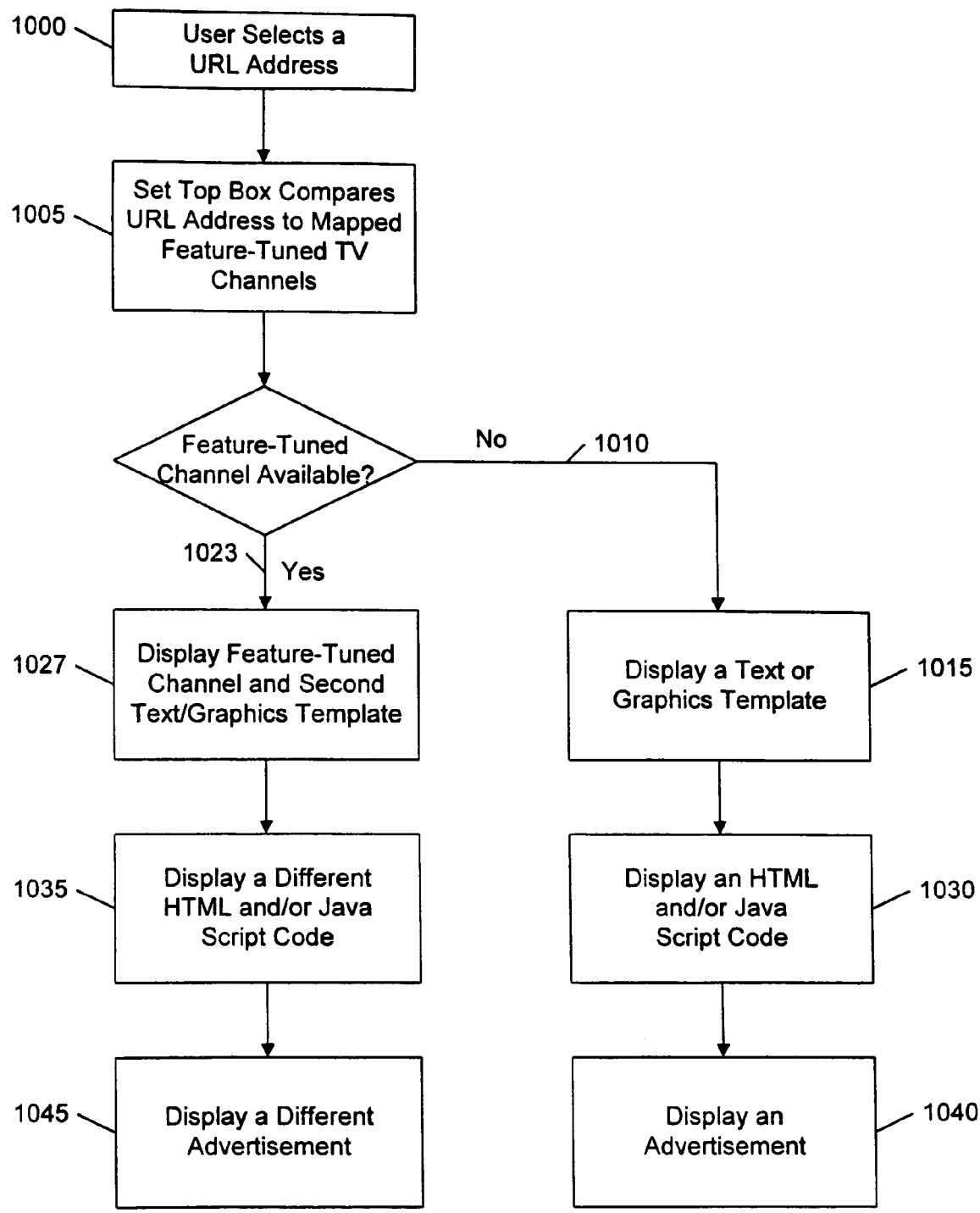
FIG. 18 is a flow chart showing the use of Channel Availability as a criteria to determine the content of the page or object displayed in Differentiation by Channel Availability.
Figure 19:
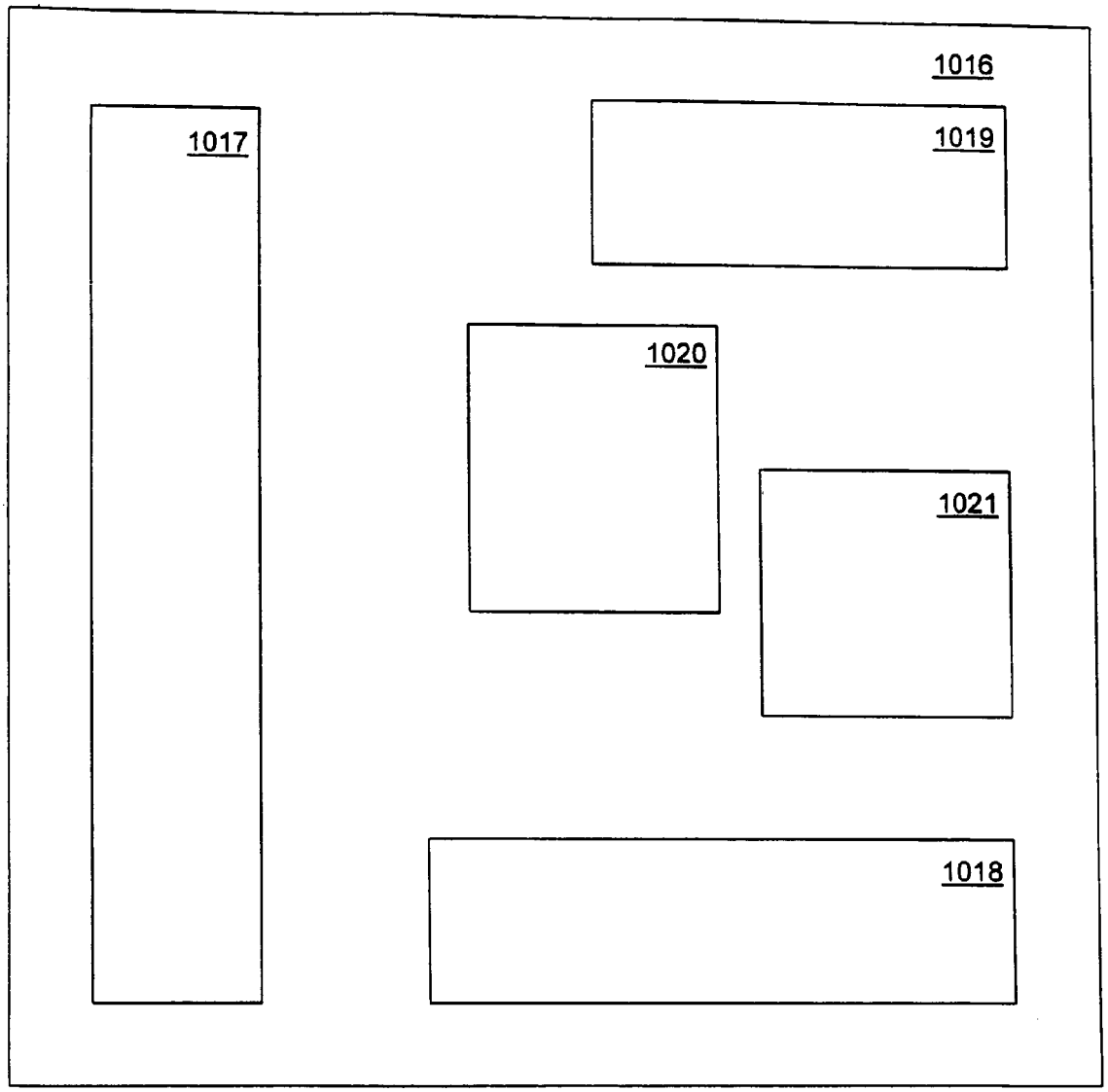
FIGS. 19 and 20 are mockups of screen shots of web content screens resulting from application of Differentiation by Channel Availability.
Figure 20:
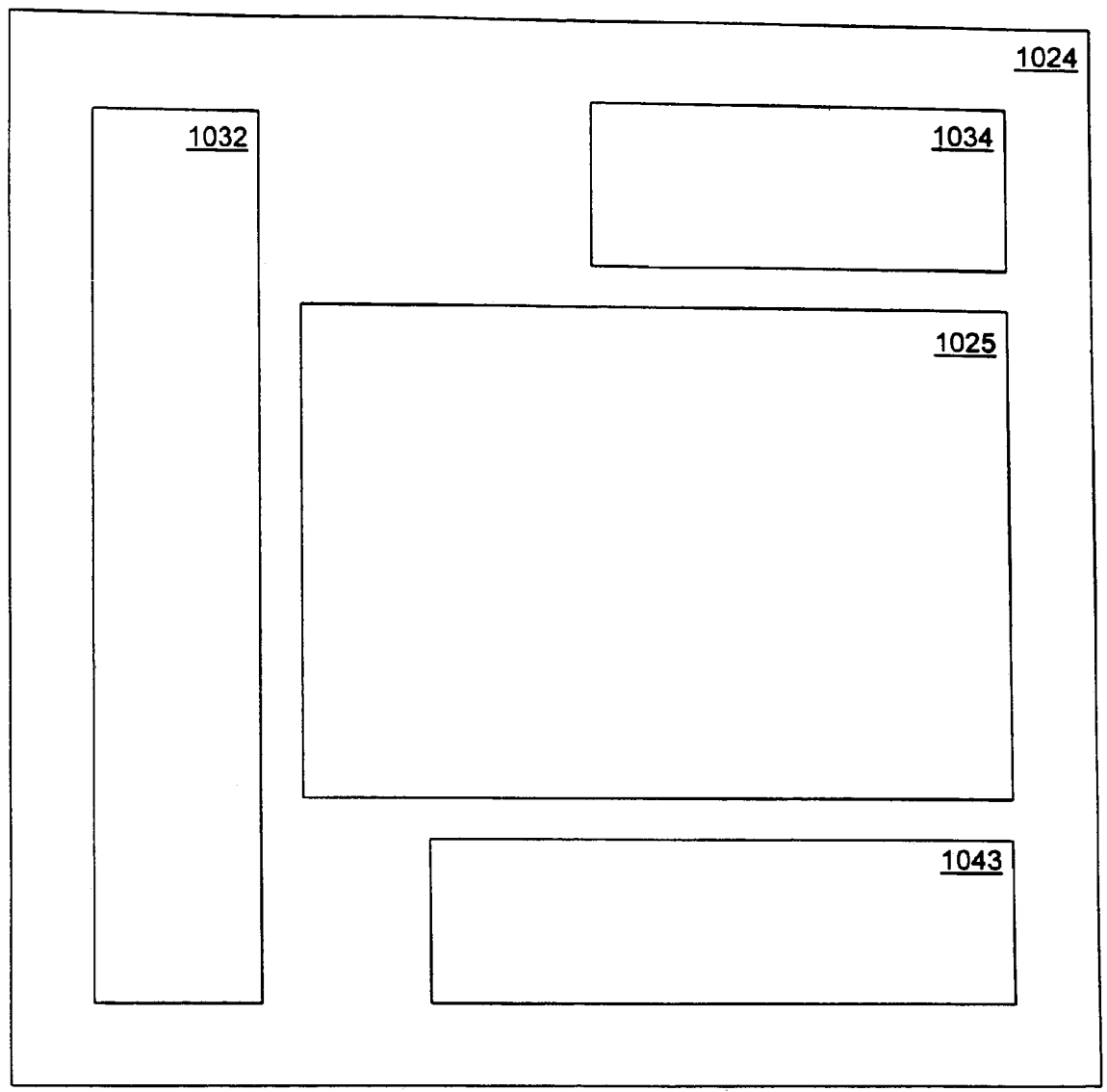

FIGS. 18–20 illustrate another example of "Differentiation by Channel Availability," in which the decision-making method is used to decide which graphics template, corresponding to formats of various web pages, to display as a web content screen based on a specific TV channel's status, i.e., the availability of the channel in the user's line-up. In this manner, the Internet-based TV provider can change the format of the web content screen based on the availability, or lack thereof, of a Feature Tuned channel. For example, if a certain Feature Tuned channel is available, various hot spots, links, and objects may be displayed that rely on and relate to the channel. If the channel is not available, the format of the web content screen may be varied by necessity to display other hot spots, links, and objects that do not rely on the user viewing the channel but that may nonetheless relate to the content of the channel.

In this method, the user selects a URL address (step 1000), such as a gardening website, which causes the set top box to compare the mapping between the URL addresses and the Feature Tuned channels, as described above with reference to FIG. 6, to determine the availability of a Feature Tuned channel associated with that URL address (step 1005).

If there is no Feature Tuned channel associated with that URL address (step 1010), the set top box, based on information either stored locally or received from a host computer, displays a text or graphics template (step 1015), which is a template for the web content screen 1016 and may include links 1017, hotspots 1018, advertisements 1019, and other screen real estate complementary to the URL address, as illustrated in FIG. 19. Because the particular Feature Tuned channel is unavailable, the template displayed may, for example, provide information relating to the content displayed on the unavailable Feature Tuned channel. The text or graphics template also may include an ad for the unavailable Feature Tuned channel. The ad may include a link to email the user's TV provider with a request to either order the channel or have the channel added to the provider's line-up.

Thus, if the unavailable Feature Tuned channel is a gardening channel, the template displayed may include, for example, a number of photographs 1020 and 1021 from the show currently broadcast on that channel to illustrate typical information that is provided as part of the show. The underlying notion is to provide the viewer with a taste of what this currently unsubscribed channel offers, and thereby entice the viewer to subscribe to that channel. In other words, the template acts as an abstract and/or advertisement for the unsubscribed channel. If the Feature Tuned channel is available (step 1010), the Internet provider may display a different content screen 1024 that may have a different text and graphics template, but one that includes a PIP window 1025 displaying the Feature Tuned channel (step 1027) that replaces photographs 1020 and 1021 of FIG. 19.

In addition, HTML and/or Java script code that is downloaded as part of a web page's content or as part of a template may be differentiated based on a channel's availability. Referring again to FIG. 18, if the Feature Tuned channel is not available (step 1010), the set top box may execute, along with the text or graphics template, a HTML and/or Java script code (step 1030). Because the channel is not available, the code may provide hyperlinks 1032 to information related to the subject matter of the broadcast displayed on the Feature Tuned channel. If the unavailable Feature Tuned channel is a gardening channel, the code may provide hyperlinks to gardening web pages and related advertisements by causing a window to be displayed that includes those hyperlinks.

On the other hand, if the Feature Tuned channel is available (step 1010), the set top box can execute with the Feature Tuned channel a different HTML and/or Java script code 1034 (step 1035) that may more closely relate to the Feature Tuned channel than would the code executed when the Featured Tuned channel is unavailable. Assuming still that the Feature Tuned channel is the gardening channel, the code also may include hyperlinks to a web page produced in connection with the Feature Tuned channel.

FIGS. 18–20 also illustrate an implementation of "Differentiation by Channel Availability" (i.e., the decision-making method used to decide what to display based on a specific TV channel's status, such as its availability in the user's line-up) applied to advertising. In this manner, the Internet-based TV provider can vary the advertising based on a channel's availability. Referring again to FIG. 18, if the Feature Tuned channel is not available (step 1010), the set top devices can be programmed to display the advertisements 1019 (step 1040). Because in this case the channel is not available, the advertisements may be designed so that they do not rely on viewing the channel to provide context for the product promoted. Again, if the unavailable Feature Tuned channel is a gardening channel, the advertisement may be to a product used on the show. Moreover, the advertisement may provide an in-depth description of a feature of the product that would otherwise be evident only from viewing the channel.

If the Feature Tuned channel is available (step 1010), the Internet provider also can display a different advertisement 1043 (step 1045) that may be closely related to a product included in a broadcast on the Feature Tuned channel and for which less information is necessary for someone viewing the broadcast. Assuming still that the Feature Tuned channel is the gardening channel, the advertisements may be brief displays of information on how to order a product that was used on a program associated with that channel. In this case, the international content of the advertisement can be abbreviated based on context that the viewer receives from the Feature Tuned channel. As a result, advertisement space usage and efficiency are enhanced. After viewing the program, the viewer likely would have enough information about the product to have made a purchase decision, i.e., to buy or not to buy. Thus, the purchasing-inclined viewer would be interested in learning how to purchase the product, and less interested in seeing repetitive information about the product.

Another reason to differentiate advertising by Channel Availability is the undesirability of displaying advertisements for a program, or closely related to the subject matter of the program, if that channel is unavailable in the user's Channel Lineup. That is, in one sense, displaying advertisements for unavailable programs could be viewed as an inefficient usage of ad space. On the other hand, depending on the Internet-based TV service provider's preferences, displaying ads for currently unavailable programs could entice the viewer to subscribe to the corresponding channel.

As described above, in a typical implementation of Content Differentiation by Channel Lineup using Featured Tuning and Differentiation by Channel Availability, the web-based TV provider determines each subscriber's Channel Lineup (i.e., set of available channels). AOLTV, a Web-based TV service offered by America Online, for example, provides a set top box that has the ability to perform a "Channel Scan", which is defined as the ability to scan the signals received by the TV tuner and determine the channels available and subscribed. The scan may be performed periodically to sense and compensate for changes in Channel Availability and/or as a result of a user's changing his/her cable TV subscription. The set top box performs the "Channel Scan" using software provided, for example, by the Internet-based TV content provider. The results of the Channel Scan are stored in the set top box and are used along with the mapping between the URL addresses and Feature Tuned channels to cause an available and subscribed channel to be displayed when a URL address is accessed. The results also are used to determine what objects, as described above, to display on the web content screen.

Figure 21:
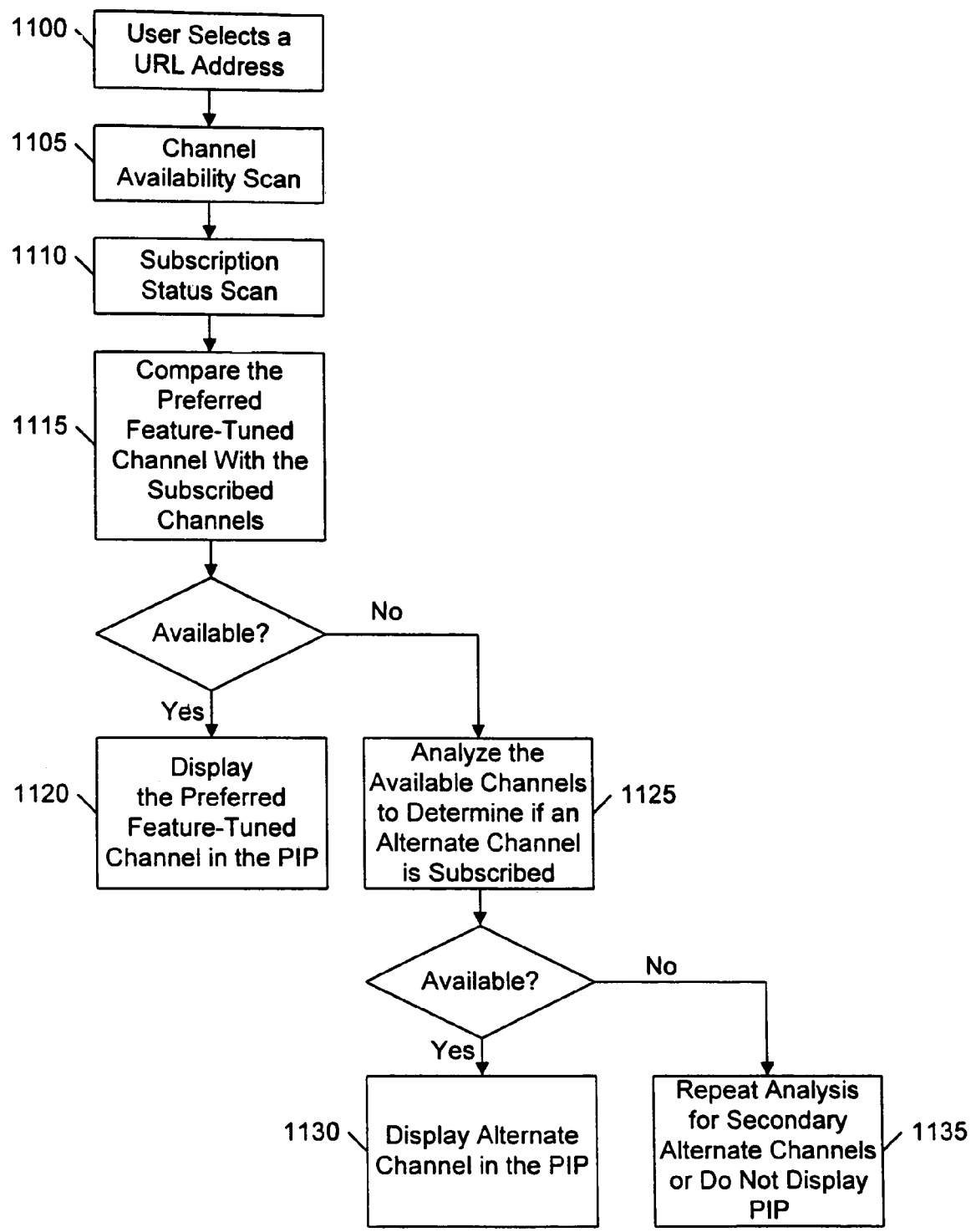
FIG. 21 is a flow chart showing the use of Channel Scanning to determine Channel Availability and subscription status.

FIG. 21 illustrates a decision-making method that could be used on a set top box, for example, that involves scanning for Channel Availability and subscription status, and Featured tuning. First, a user selects a URL address, such as a movie-related page, which starts a decision-making hierarchy to determine what to display in a PIP (step 1100). The set top box then performs a Channel Availability scan of the TV tuner in the set top box to determine which channels are available to viewers in that locale (step 1105).

The set top box next performs a subscription status scan to determine the subscription status of each available channel, i.e., which available channels have been subscribed to for that set top box (step 1110). The set top box compares the preferred Feature Tuned channel for the user-selected URL address with the subscribed channels to determine if the preferred Feature Tuned channel is available for display (step 11 15). If the channel is available, it is displayed, for example, in the PIP (step 1120). If the channel is unavailable, the set top box analyzes the available channels to determine if an alternate channel is available (step 1125). This step is repeated based on decision-making criteria until an alternate channel is displayed in the PIP or until it is determined that no corresponding channel is available (in which case the PIP optionally may not be displayed).

Although FIG. 21 only illustrates the scan and Featured Tuning aspects, other features described above may be employed. For example, applying Differentiation by Channel Availability to text/graphics, HTML and Java script code, and advertising can be used to ensure that the content displayed is complementary to the displayed Feature Tuned channel. In this manner, the set top box scans the available channels, displays a Feature Tuned channel in the PIP, and then determines what other complementary content should be displayed, such as links to related web pages, advertisements, and related text or graphics.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices;

magnetic disks such as internal hard disks and removable disks; magneto-optical disks; and CD-ROM disks.

Any of the foregoing may be supplemented by, or implemented in, specially-designed ASICs (application-specific integrated circuits).

A number of implementations have been described. Nevertheless, it will be understood that various modifications may be made. Accordingly, other implementations are within the scope of the following claims.

What is claimed is:

1. A computer-implemented method comprising:
   receiving a first URL address corresponding to a first web page;
   accessing content and serving the first web page based on the first URL address;
   receiving specification of a second URL address corresponding to a second web page;
   changing from the first web page to the second web page based on the received specification of the second URL address;
   motivating an automatic change in television channel from a first television channel to a second television channel based upon a change from the first web page to the second web page; and
   displaying the second television channel.

2. The method of claim 1 further comprising:
   browsing the Internet based on the second URL address to identify second content relevant to the second URL address; and
   displaying the second content.

3. The method of claim 2 further comprising receiving the identified content from a source other than a broadcast signal.

4. The method of claim 2 further comprising:
   browsing the Internet based on the first URL address to identify first content relevant to the first URL address;
   displaying the first content;
   determining the first television channel based on the first URL address; and
   displaying the first television channel.

5. The method of claim 1 wherein motivating an automatic change further comprises:
   determining the second television channel based upon the second URL address; and
   changing the television channel from the first television channel to the second television channel in response to receipt of the second URL address.

6. The method of claim 5 further comprising:
   browsing the Internet based on the second URL address to identify second content relevant to the second URL address; and
   displaying the second content; and
   wherein determining the second television channel comprises determining the second television channel including television content relevant to but different from the second content.

7. The method of claim 5 further comprising:
   receiving a user input specifying a user-selected television channel having television content different from and unrelated to the second television channel; and
   displaying the user-selected television channel in place of the second television channel and concurrently displaying the second content relevant to the second URL address.

8. The method of claim 5 wherein determining the second television channel comprises:
   performing a channel availability scan to create a list of channels available from the television provider;
   performing a subscription status scan on the listed channels available to create a subset list of subscribed channels;
   identifying a primary related television channel based on the second URL address;
   determining whether the primary related television channel is one of the listed subscriber channels;
   if so, selecting, for display, the primary related television channel;
   if not, identifying a secondary related television channel based on the second URL address;
   determining whether the secondary related television channel is one of the listed subscriber channels; and
   if so, selecting, for display, the secondary related television channel.

9. The method of claim 5 wherein determining the second television channel comprises:
   comparing the second URL address to a list of television channels comprising at least a primary related television channel; and
   selecting, for display, the primary related television channel.

10. The method of claim 9 wherein determining the second television channel further comprises:
    determining whether the primary related television channel is available; and
    if not, identifying a secondary related television channel based on the second URL address;
    determining whether the secondary related television channel is available; and
    if so, selecting, for display, the secondary related television channel.

11. The method of claim 10 further comprising, if the secondary related television channel is not available, calling a third URL address.

12. The method of claim 10 further comprising, if the secondary related television channel is not available, executing a Java script function.

13. The method of claim 10 further comprising selecting, for display, a text/graphics template if neither the primary related television channel nor the secondary related television channel are available.

14. The method of claim 13 further comprising selecting, for execution, an HTML code based on the text/graphics template selected.

15. The method of claim 13 further comprising selecting, for execution, a Java script code based on the text/graphics template selected.

16. The method of claim 13 further comprising selecting, for display, an advertisement based on the text/graphics template selected.

17. The method of claim 9 further comprising selecting, for display, a text/graphics template based on the second television channel.

18. The method of claim 9 further comprising selecting, for execution, an HTML code based on the second television channel.

19. The method of claim 9 further comprising selecting, for execution, a Java script code based on the second television channel.

20. The method of claim 9 further comprising selecting, for display, an advertisement hot spot based on the second television channel.

21. The method of claim 1 wherein receiving the user input specifying the second URL address further comprises executing a Java script function to specify the second URL address.

22. The method of claim 1 wherein specifying the second URL address comprises specifying the second URL address based on input received from a user.

23. The method of claim 1 further comprising:
receiving a user input specifying a user-selected television channel having content different from the second television channel; and
displaying the user-selected television channel in place of the second television channel and concurrently displaying second content relevant to the second URL address.

24. The method of claim 23 further comprising receiving a user input specifying the second URL address and displaying the second television channel.

25. The method of claim 23 further comprising selecting, for display on the video display, an object relating to the second television channel.

26. The method of claim 25 wherein selecting the object for display comprises comparing the second television channel with a mapping of objects and selecting a primary related object corresponding to the second television channel.

27. A computer program, stored in a computer-readable medium, comprising instructions for causing a computer system to:
receive a first URL address corresponding to a first web page;
access content and serve the first web page based on the first URL address;
receive specification of a second URL address corresponding to a second web page;
change from the first web page to the second web page based on the received specification of the second URL address;
motivate an automatic change in television channel from a first television channel to a second television channel based upon a change from the first web page to the second web page; and
display the second television channel.

28. The computer program of claim 27 further comprising instructions for causing a computer system to receive the identified content from a source other than a broadcast signal.

29. The computer program of claim 27 wherein instructions for causing a computer system to motivate an automatic change further comprises instructions for causing a computer system to:
determine the second television channel based upon the second URL address; and
change the television channel from the first television channel to the second television channel in response to receipt of the second URL address.

30. The computer program of claim 29 further comprising instructions for causing a computer system to:
browse the Internet based on the second URL address to identify second content relevant to the second URL address; and
display the second content; and
wherein instructions for causing a computer system to determine the second television channel comprises instructions for causing a computer system to determine the second television channel including television content relevant to but different from the second content.

31. The computer program of claim 29 further comprising instructions for causing a computer system to:
receive a user input specifying a user-selected television channel having television content different from and unrelated to the second television channel; and
display the user-selected television channel in place of the second television channel and concurrently display the second content relevant to the second URL address.

32. The computer program of claim 29 wherein instructions for causing a computer system to determine the second television channel comprises instructions for causing a computer system to:
perform a channel availability scan to create a list of channels available from the television provider;
perform a subscription status scan on the listed channels available to create a subset list of subscribed channels;
identify a primary related television channel based on the second URL address;
determine whether the primary related television channel is one of the listed subscriber channels;
if so, select, for display, the primary related television channel;
if not, identify a secondary related television channel based on the second URL address;
determine whether the secondary related television channel is one of the listed subscriber channels; and
if so, select, for display, the secondary related television channel.

33. The computer program of claim 29 wherein instructions for causing a computer system to determine the second television channel comprises instructions for causing a computer system to:
compare the second URL address to a list of television channels comprising at least a primary related television channel; and
select, for display, the primary related television channel.

34. The computer program of claim 33 wherein instructions for causing a computer system to determine the second television channel further comprises instructions for causing a computer system to:
determine whether the primary related television channel is available; and
if not, identify a secondary related television channel based on the second URL address;
determine whether the secondary related television channel is available; and
if so, select, for display, the secondary related television channel.

35. The computer program of claim 27 further comprising instructions for causing a computer system to:
receive a user input specifying a user-selected television channel having content different from the second television channel; and
display the user-selected television channel in place of the second television channel and concurrently display second content relevant to the second URL address.

36. A computer program, stored in a computer-readable medium, the computer program comprising:
means for receiving a first URL address corresponding to a first web page;
means for accessing content and serve the first web page based on the first URL address;
means for receiving specification of a second URL address corresponding to a second web page;
means for changing from the first web page to the second web page based on the received specification of the second URL address;

means for motivating an automatic change in television channel from a first television channel to a second television channel based upon a change from the first web page to the second web page; and means for displaying the second television channel.

37. The computer program of claim 36 further comprising means for receiving the identified content from a source other than a broadcast signal.

38. The computer program of claim 36 wherein means for motivating an automatic change further comprises:

means for determining the second television channel based upon the second URL address; and means for changing the television channel from the first television channel to the second television channel in response to receipt of the second URL address.

39. The computer program of claim 38 further comprising:

means for browsing the Internet based on the second URL address to identify second content relevant to the second URL address; and means for displaying the second content; and wherein means for determining the second television channel comprises means for determining the second television channel including television content relevant to but different from the second content.

40. The computer program of claim 38 further comprising:

means for receiving a user input specifying a user-selected television channel having television content different from and unrelated to the second television channel; and means for displaying the user-selected television channel in place of the second television channel and concurrently displaying the second content relevant to the second URL address.

41. The computer program of claim 38 wherein means for determining the second television channel comprises:

means for performing a channel availability scan to create a list of channels available from the television provider;

means for performing a subscription status scan on the listed channels available to create a subset list of subscribed channels;

means for identifying a primary related television channel based on the second URL address;

means for determining whether the primary related television channel is one of the listed subscriber channels;

if so, means for selecting, for display, the primary related television channel;

if not, means for identifying a secondary related television channel based on the second URL address;

means for determining whether the secondary related television channel is one of the listed subscriber channels; and if so, means for selecting, for display, the secondary related television channel.

42. The computer program of claim 38 wherein means for determining the second television channel comprises:

means for comparing the second URL address to a list of television channels comprising at least a primary related television channel; and means for selecting, for display, the primary related television channel.

43. The computer program of claim 42 wherein means for determining the second television channel further comprises:

means for determining whether the primary related television channel is available; and if not, means for identifying a secondary related television channel based on the second URL address;

means for determining whether the secondary related television channel is available; and if so, means for selecting, for display, the secondary related television channel.

44. The computer program of claim 36 further comprising:

means for receiving a user input specifying a user-selected television channel having content different from the second television channel; and means for displaying the user-selected television channel in place of the second television channel and concurrently displaying second content relevant to the second URL address.

* * * * *